United States Patent
Guntaka et al.

(10) Patent No.: US 9,524,173 B2
(45) Date of Patent: Dec. 20, 2016

(54) FAST REBOOT FOR A SWITCH

(71) Applicant: BROCADE COMMUNICATIONS SYSTEMS, INC., San Jose, CA (US)

(72) Inventors: Vidyasagara R. Guntaka, San Jose, CA (US); Suresh Vobbilisetty, San Jose, CA (US); Manjunath A. G. Gowda, San Jose, CA (US); Pasupathi Duraiswamy, Milpitas, CA (US)

(73) Assignee: BROCADE COMMUNICATIONS SYSTEMS, INC., San Jose, CA (US)

( * ) Notice: Subject to any disclaimer, the term of this patent is extended or adjusted under 35 U.S.C. 154(b) by 140 days.

(21) Appl. No.: 14/511,026

(22) Filed: Oct. 9, 2014

(65) Prior Publication Data
US 2016/0103692 A1    Apr. 14, 2016

(51) Int. Cl.
G06F 9/00 (2006.01)
G06F 9/44 (2006.01)
H04L 12/24 (2006.01)
H04L 12/741 (2013.01)

(52) U.S. Cl.
CPC ............ *G06F 9/4401* (2013.01); *G06F 8/35* (2013.01); *H04L 41/0853* (2013.01); *H04L 41/0856* (2013.01); *H04L 45/74* (2013.01)

(58) Field of Classification Search
CPC .... G06F 9/44526; G06F 9/44508; G06F 8/65; G06F 9/44502; G06F 15/7867
See application file for complete search history.

(56) References Cited

U.S. PATENT DOCUMENTS

| | | | |
|---|---|---|---|
| 829,529 | A | 8/1906 | Keathley |
| 5,390,173 | A | 2/1995 | Spinney |
| 5,802,278 | A | 9/1998 | Isfeld |
| 5,878,232 | A | 3/1999 | Marimuthu |
| 5,959,968 | A | 9/1999 | Chin |
| 5,973,278 | A | 10/1999 | Wehrill, III |

(Continued)

FOREIGN PATENT DOCUMENTS

| | | |
|---|---|---|
| CN | 102801599 A | 11/2012 |
| EP | 0579567 | 5/1993 |

(Continued)

OTHER PUBLICATIONS

Eastlake, D. et al., 'RBridges: TRILL Header Options', Dec. 24, 2009, pp. 1-17, TRILL Working Group.

(Continued)

*Primary Examiner* — Zahid Choudhury
(74) *Attorney, Agent, or Firm* — Shun Yao; Park, Vaughan, Fleming & Dowler LLP

(57) ABSTRACT

One embodiment of the present invention provides a switch. The switch includes a packet processor, a persistent storage module, and a boot-up management module. The packet processor identifies a switch identifier associated with the switch in the header of a packet. The persistent storage module stores configuration information of the switch in a first table in a local persistent storage. This configuration information is included in a configuration file, and the first table includes one or more columns for the attribute values of the configuration information. The boot-up management module loads the attribute values to corresponding switch modules from the first table without processing the configuration file.

26 Claims, 19 Drawing Sheets

(56) References Cited

U.S. PATENT DOCUMENTS

| | | | |
|---|---|---|---|
| 5,983,278 | A | 11/1999 | Chong |
| 6,041,042 | A | 3/2000 | Bussiere |
| 6,085,238 | A | 7/2000 | Yuasa |
| 6,104,696 | A | 8/2000 | Kadambi |
| 6,185,214 | B1 | 2/2001 | Schwartz |
| 6,185,241 | B1 | 2/2001 | Sun |
| 6,331,983 | B1 | 12/2001 | Haggerty |
| 6,438,106 | B1 | 8/2002 | Pillar |
| 6,498,781 | B1 | 12/2002 | Bass |
| 6,542,266 | B1 | 4/2003 | Phillips |
| 6,633,761 | B1 | 10/2003 | Singhal |
| 6,636,963 | B1* | 10/2003 | Stein ............ G06F 9/4418 713/1 |
| 6,771,610 | B1 | 8/2004 | Seaman |
| 6,873,602 | B1 | 3/2005 | Ambe |
| 6,937,576 | B1 | 8/2005 | DiBenedetto |
| 6,956,824 | B2 | 10/2005 | Mark |
| 6,957,269 | B2 | 10/2005 | Williams |
| 6,975,581 | B1 | 12/2005 | Medina |
| 6,975,864 | B2 | 12/2005 | Singhal |
| 7,016,352 | B1 | 3/2006 | Chow |
| 7,061,877 | B1 | 6/2006 | Gummalla |
| 7,173,934 | B2 | 2/2007 | Lapuh |
| 7,197,308 | B2 | 3/2007 | Singhal |
| 7,206,288 | B2 | 4/2007 | Cometto |
| 7,310,664 | B1 | 12/2007 | Merchant |
| 7,313,637 | B2 | 12/2007 | Tanaka |
| 7,315,545 | B1 | 1/2008 | Chowdhury et al. |
| 7,316,031 | B2 | 1/2008 | Griffith |
| 7,330,897 | B2 | 2/2008 | Baldwin |
| 7,380,025 | B1 | 5/2008 | Riggins |
| 7,397,794 | B1 | 7/2008 | Lacroute |
| 7,430,164 | B2 | 9/2008 | Bare |
| 7,453,888 | B2 | 11/2008 | Zabihi |
| 7,477,894 | B1 | 1/2009 | Sinha |
| 7,480,258 | B1 | 1/2009 | Shuen |
| 7,508,757 | B2 | 3/2009 | Ge |
| 7,558,195 | B1 | 7/2009 | Kuo |
| 7,558,273 | B1 | 7/2009 | Grosser |
| 7,571,447 | B2 | 8/2009 | Ally |
| 7,599,901 | B2 | 10/2009 | Mital |
| 7,688,736 | B1 | 3/2010 | Walsh |
| 7,688,960 | B1 | 3/2010 | Aubuchon |
| 7,690,040 | B2 | 3/2010 | Frattura |
| 7,706,255 | B1 | 4/2010 | Kondrat et al. |
| 7,716,370 | B1 | 5/2010 | Devarapalli |
| 7,720,076 | B2 | 5/2010 | Dobbins |
| 7,729,296 | B1 | 6/2010 | Choudhary |
| 7,787,480 | B1 | 8/2010 | Mehta |
| 7,792,920 | B2 | 9/2010 | Istvan |
| 7,796,593 | B1 | 9/2010 | Ghosh |
| 7,808,992 | B2 | 10/2010 | Homchaudhuri |
| 7,836,332 | B2 | 11/2010 | Hara |
| 7,843,906 | B1 | 11/2010 | Chidambaram et al. |
| 7,843,907 | B1 | 11/2010 | Abou-Emara |
| 7,860,097 | B1 | 12/2010 | Lovett |
| 7,898,959 | B1 | 3/2011 | Arad |
| 7,912,091 | B1 | 3/2011 | Krishnan |
| 7,924,837 | B1 | 4/2011 | Shabtay |
| 7,937,756 | B2 | 5/2011 | Kay |
| 7,945,941 | B2 | 5/2011 | Sinha |
| 7,949,638 | B1 | 5/2011 | Goodson |
| 7,957,386 | B1 | 6/2011 | Aggarwal |
| 8,018,938 | B1 | 9/2011 | Fromm |
| 8,027,354 | B1 | 9/2011 | Portolani |
| 8,054,832 | B1 | 11/2011 | Shukla |
| 8,068,442 | B1 | 11/2011 | Kompella |
| 8,078,704 | B2 | 12/2011 | Lee |
| 8,102,781 | B2 | 1/2012 | Smith |
| 8,102,791 | B2 | 1/2012 | Tang |
| 8,116,307 | B1 | 2/2012 | Thesayi |
| 8,125,928 | B2 | 2/2012 | Mehta |
| 8,134,922 | B2 | 3/2012 | Elangovan |
| 8,155,150 | B1 | 4/2012 | Chung |
| 8,160,063 | B2 | 4/2012 | Maltz |
| 8,160,080 | B1 | 4/2012 | Arad |
| 8,170,038 | B2 | 5/2012 | Belanger |
| 8,175,107 | B1 | 5/2012 | Yalagandula |
| 8,194,674 | B1 | 6/2012 | Pagel |
| 8,195,774 | B2 | 6/2012 | Lambeth |
| 8,204,061 | B1 | 6/2012 | Sane |
| 8,213,313 | B1 | 7/2012 | Doiron |
| 8,213,336 | B2 | 7/2012 | Smith |
| 8,230,069 | B2 | 7/2012 | Korupolu |
| 8,239,960 | B2 | 8/2012 | Frattura |
| 8,249,069 | B2 | 8/2012 | Raman |
| 8,270,401 | B1 | 9/2012 | Barnes |
| 8,295,291 | B1 | 10/2012 | Ramanathan |
| 8,295,921 | B2 | 10/2012 | Wang |
| 8,301,686 | B1 | 10/2012 | Appajodu |
| 8,339,994 | B2 | 12/2012 | Gnanasekaran |
| 8,351,352 | B1 | 1/2013 | Eastlake |
| 8,369,335 | B2 | 2/2013 | Jha |
| 8,369,347 | B2 | 2/2013 | Xiong |
| 8,392,496 | B2 | 3/2013 | Linden |
| 8,462,774 | B2 | 6/2013 | Page |
| 8,467,375 | B2 | 6/2013 | Blair |
| 8,520,595 | B2 | 8/2013 | Yadav |
| 8,599,850 | B2 | 12/2013 | Jha |
| 8,599,864 | B2 | 12/2013 | Chung |
| 8,615,008 | B2 | 12/2013 | Natarajan |
| 8,706,905 | B1 | 4/2014 | McGlaughlin |
| 8,724,456 | B1 | 5/2014 | Hong |
| 8,806,031 | B1 | 8/2014 | Kondur |
| 8,826,385 | B2 | 9/2014 | Congdon |
| 8,918,631 | B1 | 12/2014 | Kumar |
| 8,937,865 | B1 | 1/2015 | Kumar |
| 8,995,272 | B2 | 3/2015 | Agarwal |
| 2001/0005527 | A1 | 6/2001 | Vaeth |
| 2001/0055274 | A1 | 12/2001 | Hegge |
| 2002/0019904 | A1 | 2/2002 | Katz |
| 2002/0021701 | A1 | 2/2002 | Lavian |
| 2002/0039350 | A1 | 4/2002 | Wang |
| 2002/0054593 | A1 | 5/2002 | Morohashi |
| 2002/0091795 | A1 | 7/2002 | Yip |
| 2003/0041085 | A1 | 2/2003 | Sato |
| 2003/0123393 | A1 | 7/2003 | Feuerstraeter |
| 2003/0147385 | A1 | 8/2003 | Montalvo |
| 2003/0174706 | A1 | 9/2003 | Shankar |
| 2003/0189905 | A1 | 10/2003 | Lee |
| 2003/0208616 | A1 | 11/2003 | Laing |
| 2003/0216143 | A1 | 11/2003 | Roese |
| 2003/0233534 | A1* | 12/2003 | Bernhard ............ G06F 9/4411 713/1 |
| 2004/0001433 | A1 | 1/2004 | Gram |
| 2004/0003094 | A1 | 1/2004 | See |
| 2004/0010600 | A1 | 1/2004 | Baldwin |
| 2004/0049699 | A1 | 3/2004 | Griffith |
| 2004/0057430 | A1 | 3/2004 | Paavolainen |
| 2004/0081171 | A1 | 4/2004 | Finn |
| 2004/0117508 | A1 | 6/2004 | Shimizu |
| 2004/0120326 | A1 | 6/2004 | Yoon |
| 2004/0156313 | A1 | 8/2004 | Hofmeister et al. |
| 2004/0165595 | A1 | 8/2004 | Holmgren |
| 2004/0165596 | A1 | 8/2004 | Garcia |
| 2004/0205234 | A1 | 10/2004 | Barrack |
| 2004/0213232 | A1 | 10/2004 | Regan |
| 2005/0007951 | A1 | 1/2005 | Lapuh |
| 2005/0044199 | A1 | 2/2005 | Shiga |
| 2005/0074001 | A1 | 4/2005 | Mattes |
| 2005/0094568 | A1 | 5/2005 | Judd |
| 2005/0094630 | A1 | 5/2005 | Valdevit |
| 2005/0122979 | A1 | 6/2005 | Gross |
| 2005/0157645 | A1 | 7/2005 | Rabie et al. |
| 2005/0157751 | A1 | 7/2005 | Rabie |
| 2005/0169188 | A1 | 8/2005 | Cometto |
| 2005/0195813 | A1 | 9/2005 | Ambe |
| 2005/0207423 | A1 | 9/2005 | Herbst |
| 2005/0213561 | A1 | 9/2005 | Yao |
| 2005/0220096 | A1 | 10/2005 | Friskney |
| 2005/0265356 | A1 | 12/2005 | Kawarai |
| 2005/0278565 | A1 | 12/2005 | Frattura |
| 2006/0007869 | A1 | 1/2006 | Hirota |
| 2006/0018302 | A1 | 1/2006 | Ivaldi |

(56) References Cited

U.S. PATENT DOCUMENTS

| | | |
|---|---|---|
| 2006/0023707 A1 | 2/2006 | Makishima et al. |
| 2006/0029055 A1 | 2/2006 | Perera |
| 2006/0034292 A1 | 2/2006 | Wakayama |
| 2006/0036765 A1 | 2/2006 | Weyman |
| 2006/0059163 A1 | 3/2006 | Frattura |
| 2006/0062187 A1 | 3/2006 | Rune |
| 2006/0072550 A1 | 4/2006 | Davis |
| 2006/0083254 A1 | 4/2006 | Ge |
| 2006/0098589 A1 | 5/2006 | Kreeger |
| 2006/0140130 A1 | 6/2006 | Kalkunte |
| 2006/0168109 A1 | 7/2006 | Warmenhoven |
| 2006/0184937 A1 | 8/2006 | Abels |
| 2006/0221960 A1 | 10/2006 | Borgione |
| 2006/0227776 A1 | 10/2006 | Chandrasekaran |
| 2006/0235995 A1 | 10/2006 | Bhatia |
| 2006/0242311 A1 | 10/2006 | Mai |
| 2006/0242398 A1* | 10/2006 | Fontijn .............. G06F 9/4406 713/2 |
| 2006/0245439 A1 | 11/2006 | Sajassi |
| 2006/0251067 A1 | 11/2006 | DeSanti |
| 2006/0256767 A1 | 11/2006 | Suzuki |
| 2006/0265515 A1 | 11/2006 | Shiga |
| 2006/0285499 A1 | 12/2006 | Tzeng |
| 2006/0291388 A1 | 12/2006 | Amdahl |
| 2006/0291480 A1 | 12/2006 | Cho |
| 2007/0036178 A1 | 2/2007 | Hares |
| 2007/0053294 A1 | 3/2007 | Ho |
| 2007/0083625 A1 | 4/2007 | Chamdani |
| 2007/0086362 A1 | 4/2007 | Kato |
| 2007/0094464 A1 | 4/2007 | Sharma |
| 2007/0097968 A1 | 5/2007 | Du |
| 2007/0098006 A1 | 5/2007 | Parry |
| 2007/0116224 A1 | 5/2007 | Burke |
| 2007/0116422 A1 | 5/2007 | Reynolds |
| 2007/0156659 A1 | 7/2007 | Lim |
| 2007/0177525 A1 | 8/2007 | Wijnands |
| 2007/0177597 A1 | 8/2007 | Ju |
| 2007/0183313 A1 | 8/2007 | Narayanan |
| 2007/0211712 A1 | 9/2007 | Fitch |
| 2007/0258449 A1 | 11/2007 | Bennett |
| 2007/0274234 A1 | 11/2007 | Kubota |
| 2007/0289017 A1 | 12/2007 | Copeland, III |
| 2008/0052487 A1 | 2/2008 | Akahane |
| 2008/0056135 A1 | 3/2008 | Lee |
| 2008/0065760 A1 | 3/2008 | Damm |
| 2008/0080517 A1 | 4/2008 | Roy |
| 2008/0095160 A1 | 4/2008 | Yadav |
| 2008/0101386 A1 | 5/2008 | Gray |
| 2008/0112400 A1 | 5/2008 | Dunbar et al. |
| 2008/0133760 A1 | 6/2008 | Berkvens |
| 2008/0159277 A1 | 7/2008 | Vobbilisetty |
| 2008/0172492 A1 | 7/2008 | Raghunath |
| 2008/0181196 A1 | 7/2008 | Regan |
| 2008/0181243 A1 | 7/2008 | Vobbilisetty |
| 2008/0186981 A1 | 8/2008 | Seto |
| 2008/0205377 A1 | 8/2008 | Chao |
| 2008/0219172 A1 | 9/2008 | Mohan |
| 2008/0225852 A1 | 9/2008 | Raszuk |
| 2008/0225853 A1 | 9/2008 | Melman |
| 2008/0228897 A1 | 9/2008 | Ko |
| 2008/0240129 A1 | 10/2008 | Elmeleegy |
| 2008/0267179 A1 | 10/2008 | LaVigne |
| 2008/0285458 A1 | 11/2008 | Lysne |
| 2008/0285555 A1 | 11/2008 | Ogasahara |
| 2008/0298248 A1 | 12/2008 | Roeck |
| 2008/0304498 A1 | 12/2008 | Jorgensen |
| 2008/0310342 A1 | 12/2008 | Kruys |
| 2009/0022069 A1 | 1/2009 | Khan |
| 2009/0037607 A1 | 2/2009 | Farinacci |
| 2009/0042270 A1 | 2/2009 | Dolly |
| 2009/0044270 A1 | 2/2009 | Shelly |
| 2009/0067422 A1 | 3/2009 | Poppe |
| 2009/0067442 A1 | 3/2009 | Killian |
| 2009/0079560 A1 | 3/2009 | Fries |
| 2009/0080345 A1 | 3/2009 | Gray |
| 2009/0083445 A1 | 3/2009 | Ganga |
| 2009/0092042 A1 | 4/2009 | Yuhara |
| 2009/0092043 A1 | 4/2009 | Lapuh |
| 2009/0106405 A1 | 4/2009 | Mazarick |
| 2009/0116381 A1 | 5/2009 | Kanda |
| 2009/0129384 A1 | 5/2009 | Regan |
| 2009/0138577 A1 | 5/2009 | Casado |
| 2009/0138752 A1 | 5/2009 | Graham |
| 2009/0161584 A1 | 6/2009 | Guan |
| 2009/0161670 A1 | 6/2009 | Shepherd |
| 2009/0168647 A1 | 7/2009 | Holness |
| 2009/0199177 A1 | 8/2009 | Edwards |
| 2009/0204965 A1 | 8/2009 | Tanaka |
| 2009/0213783 A1 | 8/2009 | Moreton |
| 2009/0222879 A1 | 9/2009 | Kostal |
| 2009/0232031 A1 | 9/2009 | Vasseur |
| 2009/0245137 A1 | 10/2009 | Hares |
| 2009/0245242 A1 | 10/2009 | Carlson |
| 2009/0246137 A1 | 10/2009 | Hadida |
| 2009/0252049 A1 | 10/2009 | Ludwig |
| 2009/0252061 A1 | 10/2009 | Small |
| 2009/0260083 A1 | 10/2009 | Szeto |
| 2009/0279558 A1 | 11/2009 | Davis |
| 2009/0292858 A1 | 11/2009 | Lambeth |
| 2009/0316721 A1 | 12/2009 | Kanda |
| 2009/0323698 A1 | 12/2009 | LeFaucheur |
| 2009/0323708 A1 | 12/2009 | Ihle |
| 2009/0327392 A1 | 12/2009 | Tripathi |
| 2009/0327462 A1 | 12/2009 | Adams |
| 2010/0027420 A1 | 2/2010 | Smith |
| 2010/0046471 A1 | 2/2010 | Hattori |
| 2010/0054260 A1 | 3/2010 | Pandey |
| 2010/0061269 A1 | 3/2010 | Banerjee |
| 2010/0074175 A1 | 3/2010 | Banks |
| 2010/0097941 A1 | 4/2010 | Carlson |
| 2010/0103813 A1 | 4/2010 | Allan |
| 2010/0103939 A1 | 4/2010 | Carlson |
| 2010/0131636 A1 | 5/2010 | Suri |
| 2010/0158024 A1 | 6/2010 | Sajassi |
| 2010/0165877 A1 | 7/2010 | Shukla |
| 2010/0165995 A1 | 7/2010 | Mehta |
| 2010/0168467 A1 | 7/2010 | Johnston |
| 2010/0169467 A1 | 7/2010 | Shukla |
| 2010/0169948 A1 | 7/2010 | Budko |
| 2010/0182920 A1 | 7/2010 | Matsuoka |
| 2010/0195489 A1 | 8/2010 | Zhou |
| 2010/0215042 A1 | 8/2010 | Sato |
| 2010/0215049 A1 | 8/2010 | Raza |
| 2010/0220724 A1 | 9/2010 | Rabie |
| 2010/0226368 A1 | 9/2010 | Mack-Crane |
| 2010/0226381 A1 | 9/2010 | Mehta |
| 2010/0246388 A1 | 9/2010 | Gupta |
| 2010/0257263 A1 | 10/2010 | Casado |
| 2010/0265849 A1 | 10/2010 | Harel |
| 2010/0271960 A1 | 10/2010 | Krygowski |
| 2010/0272107 A1 | 10/2010 | Papp |
| 2010/0281106 A1 | 11/2010 | Ashwood-Smith |
| 2010/0284414 A1 | 11/2010 | Agarwal |
| 2010/0284418 A1 | 11/2010 | Gray |
| 2010/0287262 A1 | 11/2010 | Elzur |
| 2010/0287548 A1 | 11/2010 | Zhou |
| 2010/0290473 A1 | 11/2010 | Enduri |
| 2010/0299527 A1 | 11/2010 | Arunan |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2010/0309912 A1 | 12/2010 | Mehta |
| 2010/0329110 A1 | 12/2010 | Rose |
| 2011/0019678 A1 | 1/2011 | Mehta |
| 2011/0032945 A1 | 2/2011 | Mullooly |
| 2011/0035489 A1 | 2/2011 | McDaniel |
| 2011/0035498 A1 | 2/2011 | Shah |
| 2011/0044339 A1 | 2/2011 | Kotalwar |
| 2011/0044352 A1 | 2/2011 | Chaitou |
| 2011/0064086 A1 | 3/2011 | Xiong |
| 2011/0064089 A1 | 3/2011 | Hidaka |
| 2011/0072208 A1 | 3/2011 | Gulati |
| 2011/0085560 A1 | 4/2011 | Chawla |

(56) References Cited

U.S. PATENT DOCUMENTS

| | | |
|---|---|---|
| 2011/0085563 A1 | 4/2011 | Kotha |
| 2011/0110266 A1 | 5/2011 | Li |
| 2011/0134802 A1 | 6/2011 | Rajagopalan |
| 2011/0134803 A1 | 6/2011 | Dalvi |
| 2011/0134925 A1 | 6/2011 | Safrai |
| 2011/0142053 A1 | 6/2011 | Van Der Merwe et al. |
| 2011/0142062 A1 | 6/2011 | Wang |
| 2011/0161494 A1 | 6/2011 | Mcdysan |
| 2011/0161695 A1 | 6/2011 | Okita |
| 2011/0176412 A1 | 7/2011 | Stine |
| 2011/0188373 A1 | 8/2011 | Saito |
| 2011/0194403 A1 | 8/2011 | Sajassi |
| 2011/0194563 A1 | 8/2011 | Shen |
| 2011/0228780 A1 | 9/2011 | Ashwood-Smith |
| 2011/0231570 A1 | 9/2011 | Altekar |
| 2011/0231574 A1 | 9/2011 | Saunderson |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268120 A1 | 11/2011 | Vobbilisetty |
| 2011/0268125 A1 | 11/2011 | Vobbilisetty |
| 2011/0273988 A1 | 11/2011 | Tourrilhes |
| 2011/0274114 A1 | 11/2011 | Dhar |
| 2011/0280572 A1 | 11/2011 | Vobbilisetty |
| 2011/0286457 A1 | 11/2011 | Ee |
| 2011/0296052 A1 | 12/2011 | Guo |
| 2011/0299391 A1 | 12/2011 | Vobbilisetty |
| 2011/0299413 A1 | 12/2011 | Chatwani |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299534 A1 | 12/2011 | Koganti |
| 2011/0299535 A1 | 12/2011 | Vobbilisetty |
| 2011/0299536 A1 | 12/2011 | Cheng |
| 2011/0317559 A1 | 12/2011 | Kern |
| 2011/0317703 A1 | 12/2011 | Dunbar et al. |
| 2012/0011240 A1 | 1/2012 | Hara |
| 2012/0014261 A1 | 1/2012 | Salam |
| 2012/0014387 A1 | 1/2012 | Dunbar |
| 2012/0020220 A1 | 1/2012 | Sugita |
| 2012/0027017 A1 | 2/2012 | Rai |
| 2012/0033663 A1 | 2/2012 | Guichard |
| 2012/0033665 A1 | 2/2012 | Jacob |
| 2012/0033668 A1 | 2/2012 | Humphries |
| 2012/0033669 A1 | 2/2012 | Mohandas |
| 2012/0033672 A1 | 2/2012 | Page |
| 2012/0063363 A1 | 3/2012 | Li |
| 2012/0075991 A1 | 3/2012 | Sugita |
| 2012/0099567 A1 | 4/2012 | Hart |
| 2012/0099602 A1 | 4/2012 | Nagapudi |
| 2012/0106339 A1 | 5/2012 | Mishra |
| 2012/0117438 A1 | 5/2012 | Shaffer |
| 2012/0131097 A1 | 5/2012 | Baykal |
| 2012/0131289 A1 | 5/2012 | Taguchi |
| 2012/0134266 A1 | 5/2012 | Roitshtein |
| 2012/0147740 A1 | 6/2012 | Nakash |
| 2012/0158997 A1 | 6/2012 | Hsu |
| 2012/0163164 A1 | 6/2012 | Terry |
| 2012/0177039 A1 | 7/2012 | Berman |
| 2012/0210416 A1 | 8/2012 | Mihelich |
| 2012/0239918 A1* | 9/2012 | Huang .................. G06F 9/4401 713/2 |
| 2012/0243539 A1 | 9/2012 | Keesara |
| 2012/0260079 A1* | 10/2012 | Mruthyunjaya ...... G06F 9/4401 713/2 |
| 2012/0275297 A1 | 11/2012 | Subramanian |
| 2012/0275347 A1 | 11/2012 | Banerjee |
| 2012/0278804 A1 | 11/2012 | Narayanasamy |
| 2012/0294192 A1 | 11/2012 | Masood |
| 2012/0294194 A1 | 11/2012 | Balasubramanian |
| 2012/0320800 A1 | 12/2012 | Kamble |
| 2012/0320926 A1 | 12/2012 | Kamath et al. |
| 2012/0327766 A1 | 12/2012 | Tsai et al. |
| 2012/0327937 A1 | 12/2012 | Melman et al. |
| 2013/0003535 A1 | 1/2013 | Sarwar |
| 2013/0003737 A1 | 1/2013 | Sinicrope |
| 2013/0003738 A1 | 1/2013 | Koganti |
| 2013/0028072 A1 | 1/2013 | Addanki |
| 2013/0034015 A1 | 2/2013 | Jaiswal |
| 2013/0034021 A1 | 2/2013 | Jaiswal |
| 2013/0067466 A1 | 3/2013 | Combs |
| 2013/0070762 A1 | 3/2013 | Adams |
| 2013/0114595 A1 | 5/2013 | Mack-Crane et al. |
| 2013/0124707 A1 | 5/2013 | Ananthapadmanabha |
| 2013/0127848 A1 | 5/2013 | Joshi |
| 2013/0136123 A1 | 5/2013 | Ge |
| 2013/0148546 A1 | 6/2013 | Eisenhauer |
| 2013/0194914 A1 | 8/2013 | Agarwal |
| 2013/0219473 A1 | 8/2013 | Schaefer |
| 2013/0250951 A1 | 9/2013 | Koganti |
| 2013/0259037 A1 | 10/2013 | Natarajan |
| 2013/0272135 A1 | 10/2013 | Leong |
| 2013/0294451 A1 | 11/2013 | Li |
| 2013/0301642 A1 | 11/2013 | Radhakrishnan |
| 2013/0346583 A1 | 12/2013 | Low |
| 2014/0013324 A1 | 1/2014 | Zhang |
| 2014/0025736 A1 | 1/2014 | Wang |
| 2014/0044126 A1 | 2/2014 | Sabhanatarajan |
| 2014/0056298 A1 | 2/2014 | Vobbilisetty |
| 2014/0105034 A1 | 4/2014 | Sun |
| 2015/0010007 A1 | 1/2015 | Matsuhira |
| 2015/0030031 A1 | 1/2015 | Zhou |
| 2015/0143369 A1 | 5/2015 | Zheng |
| 2015/0248298 A1* | 9/2015 | Gavrilov ............... G06F 9/4401 713/2 |
| 2015/0281066 A1* | 10/2015 | Koley ..................... H04L 49/70 370/392 |

FOREIGN PATENT DOCUMENTS

| | | |
|---|---|---|
| EP | 0579567 A2 | 1/1994 |
| EP | 0993156 A2 | 12/2000 |
| EP | 1398920 A2 | 3/2004 |
| EP | 1916807 A2 | 4/2008 |
| EP | 2001167 A1 | 10/2008 |
| WO | 2008056838 | 5/2008 |
| WO | 2009042919 | 4/2009 |
| WO | 2010111142 A1 | 9/2010 |
| WO | 2014031781 | 2/2014 |

OTHER PUBLICATIONS

Perlman, Radia et al., 'RBridge VLAN Mapping', TRILL Working Group, Dec. 4, 2009, pp. 1-12.

Touch, J. et al., 'Transparent Interconnection of Lots of Links (TRILL): Problem and Applicability Statement', May 2009, Network Working Group, pp. 1-17.

'RBridges: Base Protocol Specification', IETF Draft, Perlman et al., Jun. 26, 2009.

Switched Virtual Networks. 'Internetworking Moves Beyond Bridges and Routers' Data Communications, McGraw Hill. New York, US, vol. 23, No. 12, Sep. 1, 1994 (Sep. 1, 1994), pp. 66-70,72,74, XP000462385 ISSN: 0363-6399.

Office action dated Aug. 29, 2014, U.S. Appl. No. 13/042,259, filed Mar. 7, 2011.

Office Action dated Mar. 14, 2014, U.S. Appl. No. 13/092,460, filed Apr. 22, 2011.

Office action dated Aug. 21, 2014, U.S. Appl. No. 13/184,526, filed Jul. 16, 2011.

Office Action dated Mar. 6, 2014, U.S. Appl. No. 13/425,238, filed Mar. 20, 2012.

Office Action dated Feb. 28, 2014, U.S. Appl. No. 13/351,513, filed Jan. 17, 2012.

(56) References Cited

OTHER PUBLICATIONS

Brocade, 'Brocade Fabrics OS (FOS) 6.2 Virtual Fabrics Feature Frequently Asked Questions', pp. 1-6, 2009 Brocade Communications Systems, Inc.
Brocade, 'FastIron and TurboIron 24x Configuration Guide', Feb. 16, 2010.
Brocade, 'The Effortless Network: Hyperedge Technology for the Campus LAN' 2012.
Brocade 'An Introduction to Brocade VCS Fabric Technology', Dec. 3, 2012.
Christensen, M. et al., 'Considerations for Internet Group Management Protocol (IGMP) and Multicast Listener Discovery (MLD) Snooping Switches', May 2006.
FastIron Configuration Guide Supporting Ironware Software Release 07.0.00, Dec. 18, 2009.
Foundary FastIron Configuration Guide, Software Release FSX 04.2.00b, Software Release FWS 04.3.00, Software Release FGS 05.0.00a, Sep. 2008.
Knight, 'Network Based IP VPN Architecture using Virtual Routers', May 2003.
Knight P et al: 'Layer 2 and 3 Virtual Private Networks: Taxonomy, Technology, and Standardization Efforts', IEEE Communications Magazine, IEEE Service Center, Piscataway, US, vol. 142, No. 6, Jun. 1, 2004 (Jun. 1, 2004), pp. 124-131, XP001198207, ISSN: 0163-6804, DOI: 1109/MCOM.2004.1304248.
Knight S et al: 'Virtual Router Redundancy Protocol' Internet Citation Apr. 1, 1998 (Apr. 1, 1998), XP002135272 Retrieved from the Internet: URL:ftp://ftp.isi.edu/in-notes/rfc2338.txt [retrieved on Apr. 10, 2000].
Lapuh, Roger et al., 'Split Multi-Link Trunking (SMLT)', Network Working Group, Oct. 2012.
Lapuh, Roger et al., 'Split Multi-link Trunking (SMLT) draft-lapuh-network-smlt-08', Jan. 2009.
Louati, Wajdi et al., 'Network-based virtual personal overlay networks using programmable virtual routers', IEEE Communications Magazine, Jul. 2005.
Narten, T. et al., 'Problem Statement: Overlays for Network Virtualization d raft-narten-n vo3-over l ay-problem -statement-01', Oct. 31, 2011.
Office Action for U.S. Appl. No. 13/042,259, filed Mar. 7, 2011, from Jaroenchonwanit, Bunjob, dated Jan. 16, 2014.
Office Action for U.S. Appl. No. 13/092,752, filed Apr. 22, 2011, from Park, Jung H., dated Jul. 18, 2013.
Office Action for U.S. Appl. No. 13/365,993, filed Feb. 3, 2012, from Cho, Hong Sol., dated Jul. 23, 2013.
Office Action for U.S. Appl. No. 12/725,249, filed Mar. 16, 2010, dated Apr. 26, 2013.
Office Action for U.S. Appl. No. 12/725,249, filed Mar. 16, 2010, dated Sep. 12, 2012.
Office Action for U.S. Appl. No. 12/950,968, filed Nov. 19, 2010, dated Jan. 4, 2013.
Office Action for U.S. Appl. No. 12/950,968, filed Nov. 19, 2010, dated Jun. 7, 2012.
Office Action for U.S. Appl. No. 12/950,974, filed Nov. 19, 2010, dated Dec. 20, 2012.
Office Action for U.S. Appl. No. 12/950,974, filed Nov. 19, 2010, dated May 24, 2012.
Office Action for U.S. Appl. No. 13/030,688, filed Feb. 18, 2011, dated Apr. 25, 2013.
Office Action for U.S. Appl. No. 13/030,806, filed Feb. 18, 2011, dated Dec. 3, 2012.
Office Action for U.S. Appl. No. 13/030,806, filed Feb. 18, 2011, dated Jun. 11, 2013.
Office Action for U.S. Appl. No. 13/042,259, filed Mar. 7, 2011, dated Mar. 18, 2013.
Office Action for U.S. Appl. No. 13/042,259, filed Mar. 7, 2011, dated Jul. 31, 2013.
Office Action for U.S. Appl. No. 13/044,301, filed Mar. 9, 2011, dated Feb. 22, 2013.
Office Action for U.S. Appl. No. 13/044,301, filed Mar. 9, 2011, dated Jun. 11, 2013.
Office Action for U.S. Appl. No. 13/044,326, filed Mar. 9, 2011, dated Oct. 2, 2013.
Office Action for U.S. Appl. No. 13/050,102, filed Mar. 17, 2011, dated Oct. 26, 2012.
Office Action for U.S. Appl. No. 13/050,102, filed Mar. 17, 2011, dated May 16, 2013.
Office Action for U.S. Appl. No. 13/087,239, filed Apr. 14, 2011, dated May 22, 2013.
Office Action for U.S. Appl. No. 13/092,460, filed Apr. 22, 2011, dated Jun. 21, 2013.
Office Action for U.S. Appl. No. 13/092,580, filed Apr. 22, 2011, dated Jun. 10, 2013.
Office Action for U.S. Appl. No. 13/092,701, filed Apr. 22, 2011, dated Jan. 28, 2013.
Office Action for U.S. Appl. No. 13/092,701, filed Apr. 22, 2011, dated Jul. 3, 2013.
Office Action for U.S. Appl. No. 13/092,724, filed Apr. 22, 2011, dated Feb. 5, 2013.
Office Action for U.S. Appl. No. 13/092,724, filed Apr. 22, 2011, dated Jul. 16, 2013.
Office Action for U.S. Appl. No. 13/092,752, filed Apr. 22, 2011, dated Feb. 5, 2013.
Office Action for U.S. Appl. No. 13/092,864, filed Apr. 22, 2011, dated Sep. 19, 2012.
Office Action for U.S. Appl. No. 13/092,873, filed Apr. 22, 2011, dated Jun. 19, 2013.
Office Action for U.S. Appl. No. 13/092,877, filed Apr. 22, 2011, dated Mar. 4, 2013.
Office Action for U.S. Appl. No. 13/092,877, filed Apr. 22, 2011, dated Sep. 5, 2013.
Office Action for U.S. Appl. No. 13/098,360, filed Apr. 29, 2011, dated May 31, 2013.
Office Action for U.S. Appl. No. 13/098,490, filed May 2, 2011, dated Dec. 21, 2012.
Office Action for U.S. Appl. No. 13/098,490, filed May 2, 2011, dated Jul. 9, 2013.
Office Action for U.S. Appl. No. 13/184,526, filed Jul. 16, 2011, dated Jan. 28, 2013.
Office Action for U.S. Appl. No. 13/184,526, filed Jul. 16, 2011, dated May 22, 2013.
Office Action for U.S. Appl. No. 13/312,903, filed Dec. 6, 2011, dated Jun. 13, 2013.
Office Action for U.S. Appl. No. 13/092,873, filed Apr. 22, 2011, dated Nov. 29, 2013.
Office Action for U.S. Appl. No. 13/184,526, filed Jul. 16, 2011, dated Dec. 2, 2013.
Office Action for U.S. Appl. No. 13/533,843, filed Jun. 26, 2012, dated Oct. 21, 2013.
Office Action for U.S. Appl. No. 13/598,204, filed Aug. 29, 2012, dated Feb. 20, 2014.
Perlman, Radia et al., 'Challenges and Opportunities in the Design of TRILL: a Routed layer 2 Technology', 2009.
S. Nadas et al., 'Virtual Router Redundancy Protocol (VRRP) Version 3 for IPv4 and IPv6', Internet Engineering Task Force, Mar. 2010.
Office Action dated Apr. 9, 2014, U.S. Appl. No. 13/092,724, filed Apr. 22, 2011.
Office Action dated Mar. 26, 2014, U.S. Appl. No. 13/092,701, filed Apr. 22, 2011.
Office Action dated Apr. 9, 2014, U.S. Appl. No. 13/092,752, filed Apr. 22, 2011.
Office Action dated Jun. 18, 2014, U.S. Appl. No. 13/440,861, filed Apr. 5, 2012.
Office Action dated May 9, 2014, U.S. Appl. No. 13/484,072, filed May 30, 2012.
Office Action dated May 14, 2014, U.S. Appl. No. 13/533,843, filed Jun. 26, 2012.
Office Action dated Feb. 20, 2014, U.S. Appl. No. 13/598,204, filed Aug. 29, 2012.
Office Action dated Jun. 6, 2014, U.S. Appl. No. 13/669,357, filed Nov. 5, 2012.

(56) References Cited

OTHER PUBLICATIONS

Huang, Nen-Fu et al., 'An Effective Spanning Tree Algorithm for a Bridged LAN', Mar. 16, 1992.
Lapuh, Roger et al., 'Split Multi-link Trunking (SMLT)', draft-lapuh-network-smlt-08, Jul. 2008.
Office Action for U.S. Appl. No. 13/098,490, filed May 2, 2011, dated Mar. 27, 2014.
Perlman, Radia et al., 'RBridges: Base Protocol Specification; Draft-ietf-trill-rbridge-protocol-16.txt', Mar. 3, 2010, pp. 1-117.
Zhai F. Hu et al. 'RBridge: Pseudo-Nickname; draft-hu-trill-pseudonode-nickname-02.txt', May 15, 2012.
'An Introduction to Brocade VCS Fabric Technology', Brocade white paper, http://community.brocade.com/docs/DOC-2954, Dec. 3, 2012.
U.S. Appl. No. 13/030,806 Office Action dated Dec. 3, 2012.
Office action dated Jan. 10, 2014, U.S. Appl. No. 13/092,580, filed Apr. 22, 2011.
Office action dated Jan. 16, 2014, U.S. Appl. No. 13/042,259, filed Mar. 7, 2011.
Office action dated Jul. 31, 2013, U.S. Appl. No. 13/042,259, filed Mar. 7, 2011.
Office action dated Jan. 6, 2014, U.S. Appl. No. 13/092,877, filed Apr. 22, 2011.
Office action dated Oct. 2, 2013, U.S. Appl. No. 13/044,326, filed Mar. 9, 2011.
Office action dated Dec. 2, 2013, U.S. Appl. No. 13/184,526, filed Jul. 16, 2011.
Office action dated Nov. 29, 2013, U.S. Appl. No. 13/092,873, filed Apr. 22, 2011.
Office action dated Nov. 12, 2013, U.S. Appl. No. 13/312,903, filed Dec. 6, 2011.
Brocade 'Brocade Unveils' The Effortless Network, http://newsroom.brocade.com/press-releases/brocade-unveils-the-effortless-network-nasdaq-brcd-0859535, 2012.
Kreeger, L. et al., 'Network Virtualization Overlay Control Protocol Requirements draft-kreeger-nvo3-overlay-cp-00', Jan. 30, 2012.
Office Action for U.S. Appl. No. 13/365,808, Filing date Jul. 18, 2013, dated Jul. 18, 2013.
Office Action for U.S. Appl. No. 13/092,887, dated Jan. 6, 2014.
Office action dated Apr. 26, 2012, U.S. Appl. No. 12/725,249, filed Mar. 16, 2010.
Office action dated Sep. 12, 2012, U.S. Appl. No. 12/725,249, filed Mar. 16, 2010.
Office action dated Dec. 21, 2012, U.S. Appl. No. 13/098,490, filed May 2, 2011.
Office action dated Mar. 27, 2014, U.S. Appl. No. 13/098,490, filed May 2, 2011.
Office action dated Jul. 9, 2013, U.S. Appl. No. 13/098,490, filed May 2, 2011.
Office action dated May 22, 2013, U.S. Appl. No. 13/087,239, filed Apr. 14, 2011.
Office action dated Dec. 5, 2012, U.S. Appl. No. 13/087,239, filed Apr. 14, 2011.
Office action dated Feb. 5, 2013, U.S. Appl. No. 13/092,724, filed Apr. 22, 2011.
Office action dated Jun. 10, 2013, U.S. Appl. No. 13/092,580, filed Apr. 22, 2011.
Office action dated Mar. 18, 2013, U.S. Appl. No. 13/042,259, filed Mar. 7, 2011.
Office action dated Jun. 21, 2013, U.S. Appl. No. 13/092,460, filed Apr. 22, 2011.
Office action dated Jan. 28, 2013, U.S. Appl. No. 13/092,701, filed Apr. 22, 2011.
Office action dated Jul. 3, 2013, U.S. Appl. No. 13/092,701, filed Apr. 22, 2011.
Office action dated Jul. 18, 2013, U.S. Appl. No. 13/092,752, filed Apr. 22, 2011.
Office action dated Dec. 20, 2012, U.S. Appl. No. 12/950,974, filed Nov. 19, 2010.
Office action dated May 24, 2012, U.S. Appl. No. 12/950,974, filed Nov. 19, 2010.
Office action dated Sep. 5, 2013, U.S. Appl. No. 13/092,877, filed Apr. 22, 2011.
Office action dated Mar. 4, 2013, U.S. Appl. No. 13/092,877, filed Apr. 22, 2011.
Office action dated Jan. 4, 2013, U.S. Appl. No. 12/950,968, filed Nov. 19, 2010.
Office action dated Jun. 7, 2012, U.S. Appl. No. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Dec. 3, 2012, U.S. Appl. No. 13/030,806, filed Feb. 18, 2011.
Office action dated Apr. 22, 2014, U.S. Appl. No. 13/030,806, filed Feb. 18, 2011.
Office action dated Jun. 11, 2013, U.S. Appl. No. 13/030,806, filed Feb. 18, 2011.
Office action dated Apr. 25, 2013, U.S. Appl. No. 13/030,688, filed Feb. 18, 2011.
Office action dated Feb. 22, 2013, U.S. Appl. No. 13/044,301, filed Mar. 9, 2011.
Office action dated Jun. 11, 2013, U.S. Appl. No. 13/044,301, filed Mar. 9, 2011.
Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.
Office action dated Aug. 4, 2014, U.S. Appl. No. 13/050,102, filed Mar. 17, 2011.
Office action dated Jan. 28, 2013, U.S. Appl. No. 13/148,526, filed Jul. 16, 2011.
Office action dated May 22, 2013, U.S. Appl. No. 13/148,526, filed Jul. 16, 2011.
Office action dated Jun. 19, 2013, U.S. Appl. No. 13/092,873, filed Apr. 22, 2011.
Office action dated Jul. 18, 2013, U.S. Appl. No. 13/365,808, filed Feb. 3, 2012.
Office action dated Jun. 13, 2013, U.S. Appl. No. 13/312,903, filed Dec. 6, 2011.
Office Action for U.S. Appl. No. 13/030,688, filed Feb. 18, 2011, dated Jul. 17, 2014.
Office Action for U.S. Appl. No. 13/044,326, filed Mar. 9, 2011, dated Jul. 7, 2014.
Office Action for U.S. Appl. No. 13/092,752, filed Apr. 22, 2011, dated Apr. 9, 2014.
Office Action for U.S. Appl. No. 13/092,873, filed Apr. 22, 2011, dated Jul. 25, 2014.
Office Action for U.S. Appl. No. 13/092,877, filed Apr. 22, 2011, dated Jun. 20, 2014.
Office Action for U.S. Appl. No. 13/312,903, filed Dec. 6, 2011, dated Aug. 7, 2014.
Office Action for U.S. Appl. No. 13/351,513, filed Jan. 17, 2012, dated Jul. 24, 2014.
Office Action for U.S. Appl. No. 13/425,238, filed Mar. 20, 2012, dated Mar. 6, 2014.
Office Action for U.S. Appl. No. 13/556,061, filed Jul. 23, 2012, dated Jun. 6, 2014.
Office Action for U.S. Appl. No. 13/742,207 dated Jul. 24, 2014, filed Jan. 15, 2013.
Office Action for U.S. Appl. No. 13/950,974, filed Nov. 19, 2010, from Haile, Awet A., dated Dec. 2, 2012.
Office Action for U.S. Appl. No. 13/087,239, filed Apr. 14, 2011, dated Dec. 5, 2012.
Office Action for U.S. Appl. No. 13/351,513, filed Jan. 17, 2012, dated Feb. 28, 2014.
Perlman R: 'Challenges and opportunities in the design of TRILL: a routed layer 2 technology', 2009 IEEE GLOBECOM Workshops, Honolulu, HI, USA, Piscataway, NJ, USA, Nov. 30, 2009 (Nov. 30, 2009), pp. 1-6, XP002649647, DOI: 10.1109/GLOBECOM.2009. 5360776 ISBN: 1-4244-5626-0 [retrieved on Jul. 19, 2011].

(56) References Cited

OTHER PUBLICATIONS

TRILL Working Group Internet-Draft Intended status: Proposed Standard RBridges: Base Protocol Specificaiton Mar. 3, 2010.
Office action dated Aug. 14, 2014, U.S. Appl. No. 13/092,460, filed Apr. 22, 2011.
Office action dated Jul. 7, 2014, for U.S. Appl. No. 13/044,326, filed Mar. 9, 2011.
Office Action dated Dec. 19, 2014, for U.S. Appl. No. 13/044,326, filed Mar. 9, 2011.
Office Action for U.S. Appl. No. 13/092,873, filed Apr. 22, 2011, dated Nov. 7, 2014.
Office Action for U.S. Appl. No. 13/092,877, filed Apr. 22, 2011, dated Nov. 10, 2014.
Office Action for U.S. Appl. No. 13/157,942, filed Jun. 10, 2011.
Mckeown, Nick et al. "OpenFlow: Enabling Innovation in Campus Networks", Mar. 14, 2008, www.openflow.org/documents/openflow-wp-latest.pdf.
Office Action for U.S. Appl. No. 13/044,301, dated Mar. 9, 2011.
Office Action for U.S. Appl. No. 13/184,526, filed Jul. 16, 2011, dated Jan. 5, 2015.
Office Action for U.S. Appl. No. 13/598,204, filed Aug. 29, 2012, dated Jan. 5, 2015.
Office Action for U.S. Appl. No. 13/669,357, filed Nov. 5, 2012, dated Jan. 30, 2015.
Office Action for U.S. Appl. No. 13/851,026, filed Mar. 26, 2013, dated Jan. 30, 2015.
Office Action for U.S. Appl. No. 13/092,460, filed Apr. 22, 2011, dated Mar. 13, 2015.
Office Action for U.S. Appl. No. 13/425,238, dated Mar. 12, 2015.
Office Action for U.S. Appl. No. 13/092,752, filed Apr. 22, 2011, dated Feb. 27, 2015.
Office Action for U.S. Appl. No. 13/042,259, filed Mar. 7, 2011, dated Feb. 23, 2015.
Office Action for U.S. Appl. No. 13/044,301, filed Mar. 9, 2011, dated Jan. 29, 2015.
Office Action for U.S. Appl. No. 13/050,102, filed Mar. 17, 2011, dated Jan. 26, 2015.
Office action dated Oct. 2, 2014, for U.S. Appl. No. 13/092,752, filed Apr. 22, 2011.
Kompella, Ed K. et al., 'Virtual Private LAN Service (VPLS) Using BGP for Auto-Discovery and Signaling' Jan. 2007.
Rosen, E. et al., "BGP/MPLS VPNs", Mar. 1999.
Abawajy J. "An Approach to Support a Single Service Provider Address Image for Wide Area Networks Environment" Centre for Parallel and Distributed Computing, School of Computer Science Carleton University, Ottawa, Ontario, K1S 5B6, Canada.
Office Action for U.S. Appl. No. 13/425,238, filed Mar. 20, 2012, dated Mar. 12, 2015.
Office Action for U.S. Appl. No. 13/786,328, filed Mar. 5, 2013, dated Mar. 13, 2015.
Office Action for U.S. Appl. No. 14/577,785, filed Dec. 19, 2014, dated Apr. 13, 2015.
Mahalingam "VXLAN: A Framework for Overlaying Virtualized Layer 2 Networks over Layer 3 Networks" Oct. 17, 2013 pp. 1-22, Sections 1, 4 and 4.1.
Office action dated Apr. 30, 2015, U.S. Appl. No. 13/351,513, filed Jan. 17, 2012.
Office Action dated Apr. 1, 2015, U.S. Appl. No. 13/656,438, filed Oct. 19, 2012.
Office Action dated May 21, 2015, U.S. Appl. No. 13/288,822, filed Nov. 3, 2011.
Siamak Azodolmolky et al. "Cloud computing networking: Challenges and opportunities for innovations", IEEE Communications Magazine, vol. 51, No. 7, Jul. 1, 2013.
Office Action dated Apr. 1, 2015 U.S. Appl. No. 13/656,438 filed Oct. 19, 2012.
Office action dated Jun. 8, 2015, U.S. Appl. No. 14/178,042, filed Feb. 11, 2014.
Office Action Dated Jun. 10, 2015, U.S. Appl. No. 13/890,150, filed May 8, 2013.
Office Action dated Jun. 18, 215, U.S. Appl. No. 13/098,490, filed May 2, 2011.
Office Action dated Jun. 16, 2015, U.S. Appl. No. 13/048,817, filed Mar. 15, 2011.
Office Action dated 06/18/215, U.S. Appl. No. 13/098,490, filed May 2, 2011.
Abawajy J. "An Approach to Support a Single Service Provider Address Image for Wide Area Networks Environment" Centre for Parallel and Distributed Computing, School of Computer Science Carleton University, Ottawa, Ontario, K1 S 5B6, Canada.
Office Action dated Jul. 31, 2015, U.S. Appl. No. 13/598,204, filed Aug. 29, 2014.
Office Action dated Jul. 31, 2015, U.S. Appl. No. 14/473,941, filed Aug. 29, 2014.
Office Action dated Jul. 31, 2015, U.S. Appl. No. 14/488,173, filed Sep. 16, 2014.
Office Action dated Aug. 21, 2015, U.S. Appl. No. 13/776,217, filed Feb. 25, 2013.
Office Action dated Aug. 19, 2015, U.S. Appl. No. 14/156,374, filed Jan. 15, 2014.
Office Action dated Sep. 2, 2015, U.S. Appl. No. 14/151,693, filed Jan. 9, 2014.
Office Action dated Sep. 17, 2015, U.S. Appl. No. 14/577,785, filed Dec. 19, 2014.
Office Action dated Sep. 22, 2015 U.S. Appl. No. 13/656,438 filed Oct. 19, 2012.
Office Action dated Nov. 5, 2015, U.S. Appl. No. 14/178,042, filed Feb. 11, 2014.
Office Action dated Oct. 19, 2015, U.S. Appl. No. 14/215,996, filed Mar. 17, 2014.
Office Action dated Sep. 18, 2015, U.S. Appl. No. 13/345,566, filed Jan. 6, 2012.
Open Flow Switch Specification Version 1.1.0, Feb. 28, 2011.
Open Flow Switch Specification Version 1.0.0, Dec. 31, 2009.
Open Flow Configuration and Management Protocol 1.0 (OF-Config 1.0) Dec. 23, 2011.
Open Flow Switch Specification Version 1.2 Dec. 5, 2011.
Office action dated Feb. 2, 2016, U.S. Appl. No. 13/092,460, filed Apr. 22, 2011.
Office Action dated Feb. 2, 2016. U.S. Appl. No. 14/154,106, filed Jan. 13, 2014.
Office Action dated Feb. 3, 2016, U.S. Appl. No. 13/098,490, filed May 2, 2011.
Office Action dated Feb. 4, 2016, U.S. Appl. No. 13/557,105, filed Jul. 24, 2012.
Office Action dated Feb. 11, 2016, U.S. Appl. No. 14/488,173, filed Sep. 16, 2014.
Office Action dated Feb. 24, 2016, U.S. Appl. No. 13/971,397, filed Aug. 20, 2013.
Office Action dated Feb. 24, 2016, U.S. Appl. No. 12/705,508, filed Feb. 12, 2010.

\* cited by examiner

XML DEFINITION
400

```
<ManagedObject NAME = "Node" >
  <ATTRIBUTE NAME = "NodeID" TYPE = "STRING" />
  ||||
  ||||
  <ATTRIBUTE NAME = "getsPower" TYPE = "1-1-Association" RELATEDTO = "PowerSource"/>
  ||||
  ||||
  <ATTRIBUTE NAME = "includes" TYPE = "1-M-Association" RELATEDTO = "LineCard"/>
  ||||
  ||||
< ManagedObject />
```

FAST REBOOT FOR A SWITCH

RELATED APPLICATION

The present disclosure is related to U.S. patent application Ser. No. 13/087,239, titled "Virtual Cluster Switching," by inventors Suresh Vobbilisetty and Dilip Chatwani, filed 14 Apr. 2011, the disclosure of which is incorporated by reference herein.

BACKGROUND

Field

The present disclosure relates to communication networks. More specifically, the present disclosure relates to a method for a constructing a scalable system that facilitates persistent storage in a switch.

Related Art

The exponential growth of the Internet has made it a popular delivery medium for a variety of applications running on physical and virtual devices. Such applications have brought with them an increasing demand for bandwidth. As a result, equipment vendors race to build larger and faster switches with versatile capabilities. However, the size of a switch cannot grow infinitely. It is limited by physical space, power consumption, and design complexity, to name a few factors. Furthermore, switches with higher capability are usually more complex and expensive. More importantly, because an overly large and complex system often does not provide economy of scale, simply increasing the size and capability of a switch may prove economically unviable due to the increased per-port cost.

A flexible way to improve the scalability of a switch system is to build a fabric switch. A fabric switch is a collection of individual member switches. These member switches form a single, logical switch that can have an arbitrary number of ports and an arbitrary topology. As demands grow, customers can adopt a "pay as you grow" approach to scale up the capacity of the fabric switch.

Meanwhile, a switch, an individual or a member switch of a fabric switch, continues to store more configuration information as the switch participates in network virtualizations, partitions, and switch groups, and operates on a plurality of network protocols of different network layers. This configuration needs to be applied to the switch when the switch powers up, and thus, should be persistent. A switch typically stores such configuration information in a local storage in an unstructured format. The switch reads the information during booting up (i.e., powering up), and loads the information into memory. Managing persistent storage in unstructured format is inefficient and requires runtime structuring.

While persistent storage brings many desirable features to a switch, some issues remain unsolved in efficiently facilitating persistent storage in a structured way in a switch.

SUMMARY

One embodiment of the present invention provides a switch. The switch includes a packet processor, a persistent storage module, and a boot-up management module. The packet processor identifies a switch identifier associated with the switch in the header of a packet. The persistent storage module stores configuration information of the switch in a first table in a local persistent storage. This configuration information is included in a configuration file, and the first table includes one or more columns for the attribute values of the configuration information. The boot-up management module loads the attribute values to corresponding switch modules from the first table without processing the configuration file.

In a variation on this embodiment, the boot-up management module also determines whether the configuration file has been changed during a reboot of the switch.

In a further variation, in response to determining that the configuration file has been changed, boot-up management module determines a changed portion of the configuration file and updates the first table based on the changed portion.

In a variation on this embodiment, the boot-up management module maintains the order in which the attribute values are loaded to the switch modules.

In a further variation, the boot-up management module maintains the order based on a sequence table. The sequence table includes one or more execution passes. The boot-up management module sequentially loads attribute values of one pass at time to the switch modules.

In a further variation, a pass includes one or more features, which are loaded to the processing hardware during the pass. A feature corresponds to a collection of attribute values.

In a further variation, the boot-up management module maintains the order of attribute values of a feature based on a dependency map. The dependency map indicates a dependency based on a Unified Modeling Language (UML) model.

In a further variation, a pass is associated with a processing indicator which indicates whether the features of a pass are loaded to the switch modules serially or in parallel.

In a further variation, the sequence table is associated with a scope. This scope indicates a subset of attribute values of a feature to be loaded to the switch modules.

In a further variation, the sequence table is expressed based on Extensible Markup Language (XML).

In a variation on this embodiment, the switch also includes a fabric switch module which maintains a membership in a fabric switch. The fabric switch includes a plurality of switches and operates as a single switch.

BRIEF DESCRIPTION OF THE FIGURES

FIG. 4B illustrates an exemplary Extensible Markup Language (XML) representation of a class corresponding to a switch with a persistent storage framework, in accordance with an embodiment of the present invention.

FIG. 7B illustrates an exemplary sequence table which provides an order during a fast reboot of a switch, in accordance with an embodiment of the present invention.

In the figures, like reference numerals refer to the same figure elements.

DETAILED DESCRIPTION

Figure 1A:
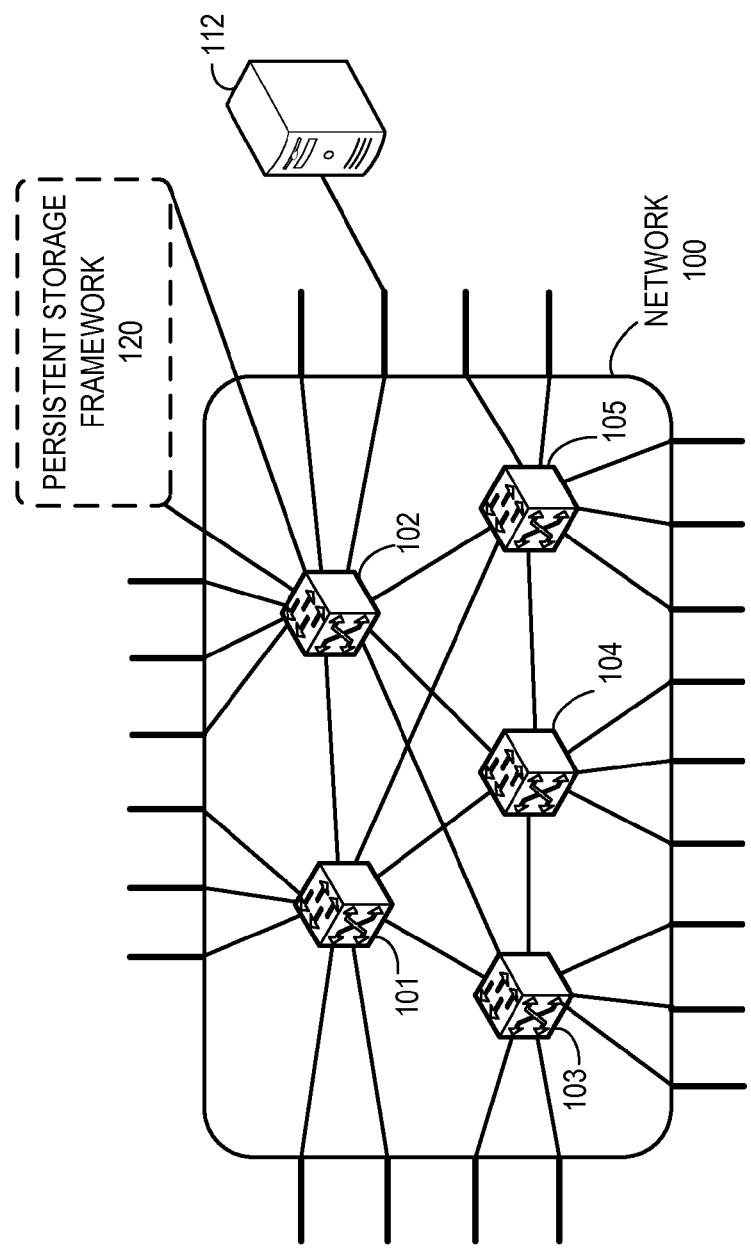
FIG. 1A illustrates an exemplary network with persistent storage framework support, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of efficiently rebooting a switch is solved by storing configuration information of the switch in a persistent storage, such as an object relational database. During reboot, the configuration information is loaded into the switch modules (e.g., processing hardware of the switch, such as an application-specific integrated circuit (ASIC) chips) from the persistent storage without applying the configuration information to the switch.

A switch, individual or a member switch of a fabric switch, stores configuration information (e.g., information associated with the operations of the switch), often in a configuration file. Such configuration information can be related to network virtualizations, partitions, and switch groups, and a plurality of network protocols of different network layers. The attribute values (e.g., parameters) of the configuration are applied to the switch (e.g., loaded to the switch modules) when the switch boots up (i.e., when the switch powers up).

Furthermore, before applying the configuration, the switch validates whether the configuration is correct and cross-checks whether the configuration includes any conflict. Moreover, during the boot up process, the switch reads and parses the attribute values stored in an unstructured format. The switch structures the attribute values during runtime, which is inefficient. As a result, each time the switch reboots, even when the switch's configuration information is not changed, the switch goes through this extensive configuration process, which can be inefficient and cause delay to network convergence.

To solve this problem, the switch is equipped with a persistent storage framework which stores the configuration information in a local persistent storage. This configuration information is loaded from this persistent storage to the switch modules (e.g., ASIC chips of the switch). The switch modules can include information based on which the switch processes packets (e.g., determines output ports for packets). During the initial boot up of the switch, the switch validates, cross-checks, and executes the configuration information from the configuration file and loads the corresponding attribute values into the switch modules.

Furthermore, the framework stores these attribute values in the persistent storage (e.g., an object relational database) of the switch. When the switch reboots, the switch checks whether the configuration information has been changed. Upon detecting one or more changes, the framework locates where the changes are and updates the corresponding persistent storage accordingly. If no change is detected, or the changes have been incorporated, the switch loads the attribute values from its persistent storage to the switch modules. In this way, the switch provides a fast reboot by bypassing the processing of the configuration file, and its corresponding extensive execution, cross-checks, and validations of the configuration information.

Segments of configuration information often depend on each other. For example, a port should be configured before associating the port with a port channel (e.g., for a trunked link). Typically, the switch processes the configuration information sequentially from the configuration file. A user (e.g., a network administrator) can enforce the dependency in configuration by including configuration information in the configuration file in a proper order. The proper order refers to a sequence of execution for the configuration file which allows the switch to be configured properly during the boot up process. However, since embodiments of the present invention bypass processing of the configuration file, dependency in the configuration information may not be enforced by the configuration file.

To solve this problem, the switch is equipped with a sequence table, which includes one or more execution passes (e.g., steps), and for each pass, includes one or more features that should be loaded to the switch modules during that pass. The switch sequentially loads configuration information of one pass at time, and sequentially loads attribute values of a respective feature in the order of the appearance of the feature in the pass to the switch modules. In this way, the switch provides a loading order for its fast reboot process. In this disclosure, the description in conjunction with FIGS. 1-5 is associated with persistent storage in the switch; and the description in conjunction with FIG. 6 and onward provides more details on fast reboot process of the switch.

In some embodiments, the framework supports Model Driven Architecture (MDA), Object Oriented Programming (OOP), and/or Model/View/Controller (MVC) design patterns to facilitate modular development and operation of the units. The framework can also support class frameworks based on Unified Modeling Language (UML). Upon receiving class models (e.g., class name, attributes, and methods) and their relations based on UML, the framework automatically generates the corresponding code, thereby ensuring structure in the operational units of a switch. In some embodiments, the class models are expressed in YANG, which is a data modeling language used to model configuration and state data manipulated by the Network Configuration Protocol (NETCONF).

Since the units operate on the framework in a modular way, their associated attribute values can be stored in a persistent storage in a structured way. In some embodiments, the framework uses Object-Relational Mapping to store the attribute values of the units in a structured way in an object relational database. The framework allows different classes to be defined for a unit based on MDA, OOP, and/or MVC design patterns. The framework then seamlessly maps a respective class to a database table and vice-versa. Furthermore, the framework also seamlessly represents the relationships among the classes (e.g., an association or a composition) in the database. As a result, when a unit becomes operational on the switch, attribute values associated with a respective class in that unit is automatically loaded from the database. Moreover, if a class changes (e.g., a new attribute or a new relationship), the framework seamlessly incorporates that change into the database.

In some embodiments, the switch can be a member switch of a fabric switch. The switch can include one or more units which allow the switch to join and operate as a member switch of the fabric switch. These units can also run on the framework. In a fabric switch, any number of switches coupled in an arbitrary topology may logically operate as a single switch. The fabric switch can be an Ethernet fabric switch or a virtual cluster switch (VCS), which can operate as a single Ethernet switch. Any member switch may join or leave the fabric switch in "plug-and-play" mode without any manual configuration. In some embodiments, a respective switch in the fabric switch is a Transparent Interconnection of Lots of Links (TRILL) routing bridge (RBridge). In some further embodiments, a respective switch in the fabric switch is an Internet Protocol (IP) routing-capable switch (e.g., an IP router).

It should be noted that a fabric switch is not the same as conventional switch stacking. In switch stacking, multiple switches are interconnected at a common location (often within the same rack), based on a particular topology, and manually configured in a particular way. These stacked switches typically share a common address, e.g., an IP address, so they can be addressed as a single switch externally. Furthermore, switch stacking requires a significant amount of manual configuration of the ports and inter-switch links. The need for manual configuration prohibits switch stacking from being a viable option in building a large-scale switching system. The topology restriction imposed by switch stacking also limits the number of switches that can be stacked. This is because it is very difficult, if not impossible, to design a stack topology that allows the overall switch bandwidth to scale adequately with the number of switch units.

In contrast, a fabric switch can include an arbitrary number of switches with individual addresses, can be based on an arbitrary topology, and does not require extensive manual configuration. The switches can reside in the same location, or be distributed over different locations. These features overcome the inherent limitations of switch stacking and make it possible to build a large "switch farm," which can be treated as a single, logical switch. Due to the automatic configuration capabilities of the fabric switch, an individual physical switch can dynamically join or leave the fabric switch without disrupting services to the rest of the network.

Furthermore, the automatic and dynamic configurability of the fabric switch allows a network operator to build its switching system in a distributed and "pay-as-you-grow" fashion without sacrificing scalability. The fabric switch's ability to respond to changing network conditions makes it an ideal solution in a virtual computing environment, where network loads often change with time.

In this disclosure, the term "fabric switch" refers to a number of interconnected physical switches which form a single, scalable logical switch. These physical switches are referred to as member switches of the fabric switch. In a fabric switch, any number of switches can be connected in an arbitrary topology, and the entire group of switches functions together as one single, logical switch. This feature makes it possible to use many smaller, inexpensive switches to construct a large fabric switch, which can be viewed as a single logical switch externally. Although the present disclosure is presented using examples based on a fabric switch, embodiments of the present invention are not limited to a fabric switch. Embodiments of the present invention are relevant to any computing device that includes a plurality of devices operating as a single device.

The term "end device" can refer to any device external to a fabric switch. Examples of an end device include, but are not limited to, a host machine, a conventional layer-2 switch, a layer-3 router, or any other type of network device. Additionally, an end device can be coupled to other switches or hosts further away from a layer-2 or layer-3 network. An end device can also be an aggregation point for a number of network devices to enter the fabric switch. An end device hosting one or more virtual machines can be referred to as a host machine. In this disclosure, the terms "end device" and "host machine" are used interchangeably.

The term "switch" is used in a generic sense, and it can refer to any standalone or fabric switch operating in any network layer. "Switch" should not be interpreted as limiting embodiments of the present invention to layer-2 networks. Any device that can forward traffic to an external device or another switch can be referred to as a "switch." Any physical or virtual device (e.g., a virtual machine/switch operating on a computing device) that can forward traffic to an end device can be referred to as a "switch." Examples of a "switch" include, but are not limited to, a layer-2 switch, a layer-3 router, a TRILL RBridge, or a fabric switch comprising a plurality of similar or heterogeneous smaller physical and/or virtual switches.

The term "edge port" refers to a port on a fabric switch which exchanges data frames with a network device outside of the fabric switch (i.e., an edge port is not used for exchanging data frames with another member switch of a fabric switch). The term "inter-switch port" refers to a port which sends/receives data frames among member switches of a fabric switch. The terms "interface" and "port" are used interchangeably.

The term "switch identifier" refers to a group of bits that can be used to identify a switch. Examples of a switch identifier include, but are not limited to, a media access control (MAC) address, an Internet Protocol (IP) address, and an RBridge identifier. Note that the TRILL standard uses "RBridge ID" (RBridge identifier) to denote a 48-bit intermediate-system-to-intermediate-system (IS-IS) System ID assigned to an RBridge, and "RBridge nickname" to denote a 16-bit value that serves as an abbreviation for the "RBridge ID." In this disclosure, "switch identifier" is used as a generic term, is not limited to any bit format, and can refer to any format that can identify a switch. The term "RBridge identifier" is also used in a generic sense, is not limited to any bit format, and can refer to "RBridge ID," "RBridge nickname," or any other format that can identify an RBridge.

The term "packet" refers to a group of bits that can be transported together across a network. "Packet" should not be interpreted as limiting embodiments of the present invention to layer-3 networks. "Packet" can be replaced by other terminologies referring to a group of bits, such as "message," "frame," "cell," or "datagram."

Network Architecture

FIG. 1A illustrates an exemplary network with persistent storage framework support, in accordance with an embodiment of the present invention. As illustrated in FIG. 1A, a network 100 includes switches 101, 102, 103, 104, and 105. An end device 112 is coupled to switch 102. In some embodiments, end device 112 is a host machine, hosting one or more virtual machines. End device 112 can include a hypervisor, which runs one or more virtual machines. End device 112 can be equipped with a Network Interface Card (NIC) with one or more ports. End device 112 couples to switch 102 via the ports of the NIC.

In some embodiments, network 100 is a TRILL network and a respective switch of network 100, such as switch 102, is a TRILL RBridge. Under such a scenario, communication among the switches in network 100 is based on the TRILL protocol. For example, upon receiving an Ethernet frame from end device 112, switch 102 encapsulates the received Ethernet frame in a TRILL header and forwards the TRILL packet. In some further embodiments, network 100 is an IP network and a respective switch of network 100, such as switch 102, is an IP-capable switch, which calculates and maintains a local IP routing table (e.g., a routing information base or RIB), and is capable of forwarding packets based on its IP addresses. Under such a scenario, communication among the switches in network 100 is based on IP. For example, upon receiving an Ethernet frame from end device 112, switch 102 encapsulates the received Ethernet frame in an IP header and forwards the IP packet.

In some embodiments, network 100 is a fabric switch (under such a scenario, network 100 can also be referred to as fabric switch 100). Fabric switch 100 is assigned with a fabric switch identifier. A respective member switch of fabric switch 100 is associated with that fabric switch identifier. This allows the member switch to indicate that it is a member of fabric switch 100. In some embodiments, whenever a new member switch joins fabric switch 100, the fabric switch identifier is automatically associated with that new member switch. Furthermore, a respective member switch of fabric switch 100 is assigned a switch identifier (e.g., an RBridge identifier, a Fibre Channel (FC) domain ID (identifier), or an IP address). This switch identifier identifies the member switch in fabric switch 100.

Switches in fabric switch 100 use edge ports to communicate with end devices (e.g., non-member switches) and inter-switch ports to communicate with other member switches. For example, switch 102 is coupled to end device 112 via an edge port and to switches 101, 103, 104, and 105 via inter-switch ports and one or more links. Data communication via an edge port can be based on Ethernet and via an inter-switch port can be based on the IP and/or TRILL protocol. It should be noted that control message exchange via inter-switch ports can be based on a different protocol (e.g., the IP or FC protocol).

A switch, such as switch 102, stores configuration information needed to operate switch 102 as an individual switch or as a member switch of fabric switch 100. Furthermore, switch 102 can participate in various services and operations, such as network virtualization (e.g., a virtual local area networks (VLAN)), switch partitioning, and link aggregations (e.g., a multi-chassis trunk). Furthermore, switch 102 operates on a plurality of network protocols of different network layers (e.g., Ethernet, TRILL, FC, and IP). As a result, switch 102 runs protocol daemons for each of these protocols. However, to incorporate the services and operations, the protocol daemons need to be directly modified, which can lead to conflicts and errors.

Furthermore, each of the operations, services, and the protocols is associated with one or more attributes. These attribute values (e.g., parameters) is typically applied to switch 102 when switch 102 powers up. As a result, these attribute values are stored in a persistent storage so that these values can be retrieved even when switch 102 is powered off or restarts. With existing technologies, switch 102 may store such attribute values in a local storage in an unstructured format (e.g., a string comprising the attribute values). During the boot up process, switch 102 reads and parses the attribute values in the unstructured format, and loads the attribute values into switch memory. Managing persistent storage in unstructured format is inefficient and requires runtime structuring.

To solve this problem, switch 102 is equipped with a persistent storage framework 120 which facilitates structured persistent storage to the attribute values associated with different operational units of switch 102 (e.g., modules and services of switch 102). It should be noted that other switches of network 100 can be equipped with a persistent storage framework and support persistent storage. In some embodiments, some switch of network 100 may not be equipped with a persistent storage framework. Different units of switch 102, each of which facilitates an aspect of switch 102's operations, operate on framework 120 in a structured and modular way. This allows a respective unit to be independently introduced to framework 120 in such a way that the unit can interoperate with other units (e.g., modules and services) of switch 102. Framework 120 supports MDA, OOP, and/or MVC design patterns to facilitate structured development and operation of the units in switch 102.

Since the units operate on framework 120 in a structured way, their associated attribute values can be stored in a persistent storage in a structured way. In some embodiments, framework 120 uses Object-Relational Mapping to store the attribute values of the units in a structured way in an object relational database. Framework 120 allows different classes to be defined for a unit during development based on MDA, OOP, and/or MVC design patterns. Framework 120 supports class models based on UML. In some embodiments, class models are expressed in YANG, which is a data modeling language used to model configuration and state data manipulated by NETCONF. Upon receiving class models (e.g., class name, attributes, and methods) and their relationships based on UML, framework 120 automatically generates the corresponding code, thereby ensuring structure in the operational units of switch 102.

Framework 120 seamlessly maps a respective class to a database table and vice-versa. Furthermore, framework 120 also seamlessly represents the relations among the classes (e.g., an association or a composition) in the database. As a result, when a unit becomes operational on switch 102 (e.g., when switch 102 powers up), attribute values associated with a respective class in that unit is automatically loaded from the database. Moreover, if a class changes (e.g., a new attribute or a new relationship), framework 120 seamlessly incorporates that change into the database.

Persistent Storage Framework

Figure 1B:
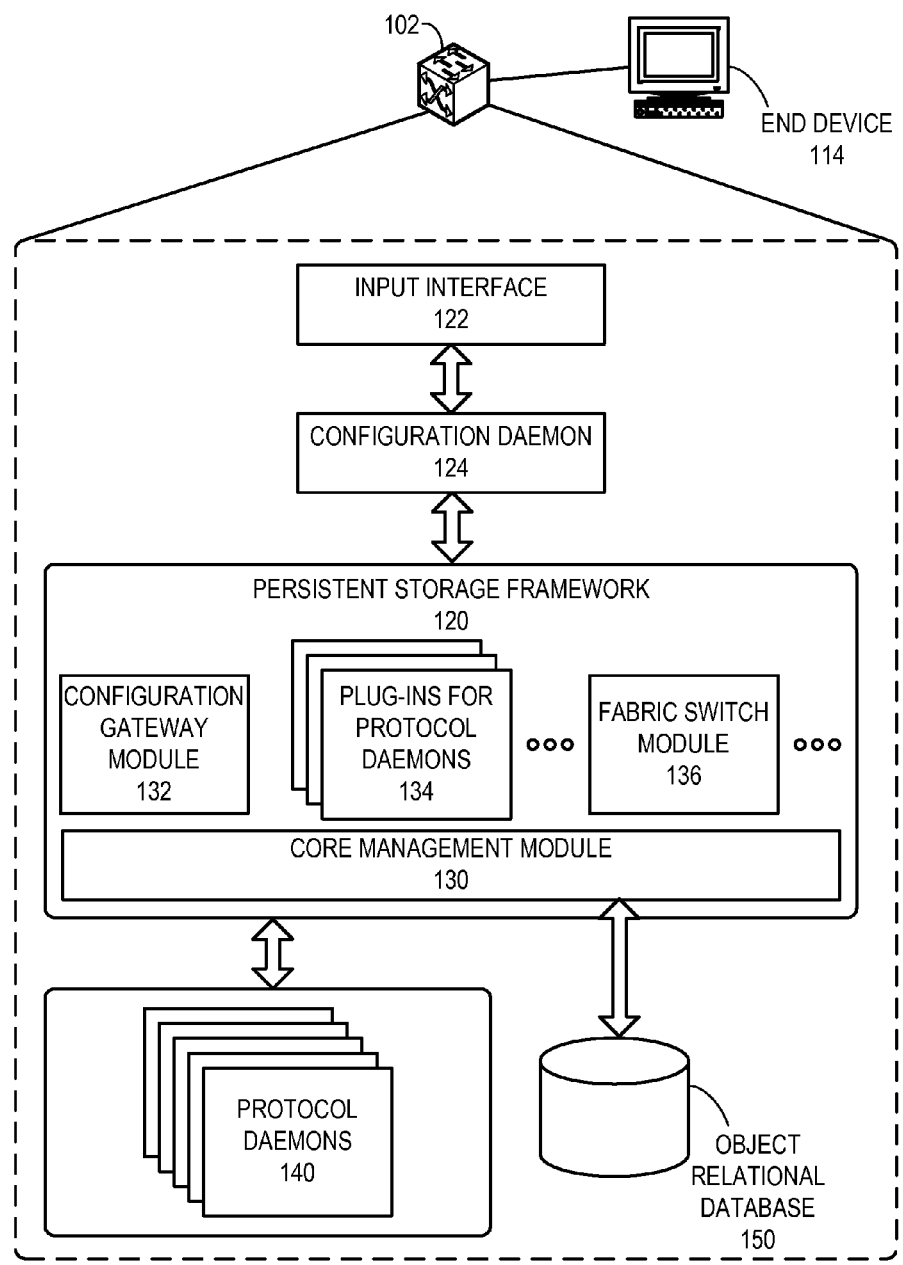
FIG. 1B illustrates an exemplary persistent storage framework support in a switch, in accordance with an embodiment of the present invention.

FIG. 1B illustrates an exemplary persistent storage framework in a switch, in accordance with an embodiment of the present invention. In this example, persistent storage framework 120 of switch 102 provides structured persistent storage to the operational units of switch 102. In some embodiments, switch 102 is coupled to an end device 114, which can operate as an administrative terminal for switch 102. Switch 102 runs one or more protocol daemons 140. For example, switch 102 can run respective protocol daemons for Ethernet, TRILL, FC, and IP. A protocol daemon facilitates the services and operations of a corresponding protocol for switch 102.

Switch 102 further includes an input interface 122 to switch 102 (e.g., a graphical user interface (GUI) and/or a command line interface (CLI). A user can access input interface 122 via end device 114. The user can obtain information from and provide instruction to switch 102 via input interface 122. Switch 102 also includes a configuration daemon 124, which can receive configuration (e.g., an IP address) for switch 102 from end device 114 (e.g., from a user) via input interface 122. Configuration daemon 124 provides this configuration information to framework 120. Framework 120 can include a configuration daemon gateway module 132, which communicates with configuration daemon 124. Upon receiving the configuration information, framework 120 can identify different attribute values (e.g., a VLAN identifier) and assigns those attribute values to the corresponding attribute of an operational unit of switch 102.

On the other hand, switch 102 can receive an instruction via input interface 122 to provide its configuration associated with one or more units. For example, a user can issue a command to show the IP addresses assigned to switch 102 from end device 114. Input interface 122 provides this instruction to configuration daemon 124, which in turn, sends an internal command to configuration daemon gateway module 132 for the requested configuration information. In response, framework 120 identifies the attributes (e.g., IP addresses) associated with the requested configuration information and obtains the corresponding attribute values (e.g., assigned IP addresses to switch 120) from a persistent storage. Configuration daemon gateway module 132 provides the obtained attribute values to configuration daemon 124. Upon receiving the attribute values, configuration daemon 124 provides the attribute values as the requested configuration information to input interface 122, which in turn, provides the configuration information to end device 114.

Framework 120 includes a core management module 130, which facilitates structured persistent storage to the attribute values associated with different operational units of switch 102 (e.g., modules and services of switch 102). Different units of switch 102 operate on core management module 130 in a structured way. This allows a respective unit to be independently introduced to framework 120 such a way that the unit can interoperate with other units (e.g., modules and services) of switch 102. Framework 120 supports MDA, OOP, and/or MVC design pattern to facilitate structured development and operation of the units in switch 102.

For example, instead of modifying protocol daemons 140, switch 102 can have plug-ins 134 for protocol daemons 140. Core management module 130 facilitates inter-operations between plug-in 134 and protocol daemons 140. Suppose that a modification to standard Ethernet protocol is needed. Instead of modifying the native protocol daemon of Ethernet, a plug-in for the protocol daemon of Ethernet can be introduced to core management module 130. Similarly, to facilitate membership to a fabric switch, fabric switch module 136 can be introduced to core management module 130. Fabric switch module 136 allows switch 102 to run a control plane with automatic configuration capability and join a fabric switch based on the control plane. Plug-ins 134 and fabric switch module 136 can be developed using MDA, OOP, and/or MVC design patterns, supported by framework 120.

Since the units of switch 102 operate core management module 130 in a structured way, their associated attribute values can be stored in a persistent storage in a structured way. In some embodiments, core management module 130 uses Object-Relational Mapping to store the attribute values of the units in a structured way in an object relational database 150. Core management module 130 allows different classes to be defined for a unit during development based on MDA, OOP, and/or MVC design patterns and expressed as a UML model, and seamlessly maps a respective class to a database table in database 150 and vice-versa.

Furthermore, core management module 130 also seamlessly represents the relations among the classes (e.g., an association or a composition) in database 150. As a result, when a unit becomes operational on switch 102 (e.g., when switch 102 powers up), attribute values associated with a respective class in that unit is automatically loaded from database 150. Moreover, if a class changes (e.g., a new attribute or a new relationship), core management module 130 seamlessly incorporates that change into database 150. It should be noted that a class defined by a user may not include explicit instructions (e.g., a Structured Query Language (SQL) query) for inserting and retrieving attribute values from database 150. The class simply includes an instruction indicating that persistent storage is required for some operations and core management module 130 facilitates the object relational mapping, and the corresponding database operations (e.g., SQL insert and select).

Attribute Data Types

To facilitate seamless object relational mapping, a persistent storage framework defines a set of data types for different categories of attributes. These attributes can be used to define class attributes of different operational units of a switch. In some embodiments, the framework can identify these class attributes expressed in a UML model. It should be noted that such expression can be represented in various forms, such as graphical, textual, XML, etc. The framework ensures these attributes are compatible with an object relational database. As a result, during operation, the framework can seamlessly map the class attributes to an object relational database and provide persistent storage to the attributes.

A data type of an attribute is basic entity provided by the framework that can be persisted or transported in the object relational database. A data type is associated with an identifier (e.g., a name). A data type can be, persisted or ephemeral, configuration or operational and read-only or read-write. The framework can serialize or de-serialize a data type to or from: XML, remote procedure call (RPC), SQL, JavaScript Object Notation (JSON), and Open vSwitch Database (OVSDB) management protocol.

The framework supports different categories of attributes. Such categories include, but are not limited to, integers and numbers, string, date and time, messaging, UML relations, network, and others. In addition, the framework supports user defined data types and corresponding attributes. Table 1 includes different categories of attributes and their corresponding data types supported by the framework. It should be noted that the categories and data types listed in Table 1 is not exhaustive. The framework can support more categories and data types.

TABLE 1

Data types supported by Persistent Storage Framework

| Category | Data Types |
| --- | --- |
| Integers and Numbers | 8-bit Unsigned Integer (UI8), 8-bit Signed Integer (SI8), UI16, SI16, UI32, SI32, UI64, SI64, 64-bit decimal (Decimal64) Vector variants of all of the above User-configured variants of all of the above UI32Range |
| String | String, StringVector, StringVectorVector, StringUC |
| Date and Time | Date, Time, DateTime Vector variants of all of the above and User-configured variants of all of the above |
| Messaging | ServiceId, ResourceId, ResourceEnum MessageType, MessagePriority, LocationId, SerializableObjectType |
| UML Relations | Association, Aggregation, Composition |
| Network | Universally Unique Identifier (UUID), World Wide Name (WWN), IPv4Address, IPv4AddressNetworkMask, IPv6Address, IPv6AddressNetworkMask, IPvXAddress, IPvXAddressNetworkMask, Uniform Resource Identifier (URI) , MACAddress, MACAddress2, Host, SNMPObjectId (Simple Network Management Protocol (SNMP)) Vector variants of all of the above and User-configured variants of all of the above |
| SQL | SQLIn, SQLBetween, SQLComparator, SQLExists |
| Other | Union, Bool, BoolUC, BoolVector, SerializableObejct, SerializableObjectVector ManagedObject, ManagedObjectVector, Enumeration ObjectId, ObjectIdVector LargeObject, Map, XML |

The framework provides extensive list of built-in data types, as described in conjunction with Table 1. These data types capture the attribute values (e.g., data fields) of objects. In some embodiments, the framework includes one or more attributes that provide run time introspection that allows runtime identification of classes. Since attributes can be serialized to and de-serialized from a variety of formats, the framework provides extensive support for custom behavior overriding in serialization and de-serialization. Furthermore, the framework supports user defined data types.
Object Identifier In the example in FIG. 1B, framework 120 stores attribute values of different classes in database 150. During operation, a class is instantiated in switch 102 (e.g., in the memory of switch 102), and one or more attributes of that instance are assigned corresponding values. For example, if the class represents a line card switch 102, an attribute can be a MAC address of a port in that line card (e.g., MACAddress data type). When the line card becomes active, an instance of the class, which can be referred to as an object, is created in the memory of switch 102, and framework 120 stores the attribute values of that object in a table associated with the class in database 150.

However, a switch can have a plurality of line cards. For another line card, another object (i.e., another instance) of the class is created in the memory of switch 102, and framework 120 stores the attribute values of that other object in the table associated with the class in database 150. In this way, the same table can store attribute values of different objects of the same class. To identify different objects of a class in the table, framework 120 generates and assigns an object identifier (object ID or OID) to a respective object of a respective class. This object identifier operates as the primary identifier of that object. In the database table, this primary identifier is the primary key of that table. It should be noted that an object identifier is referred to be associated with a class in a generic sense, which indicates an object identifier of an object of the class.

Figure 2:
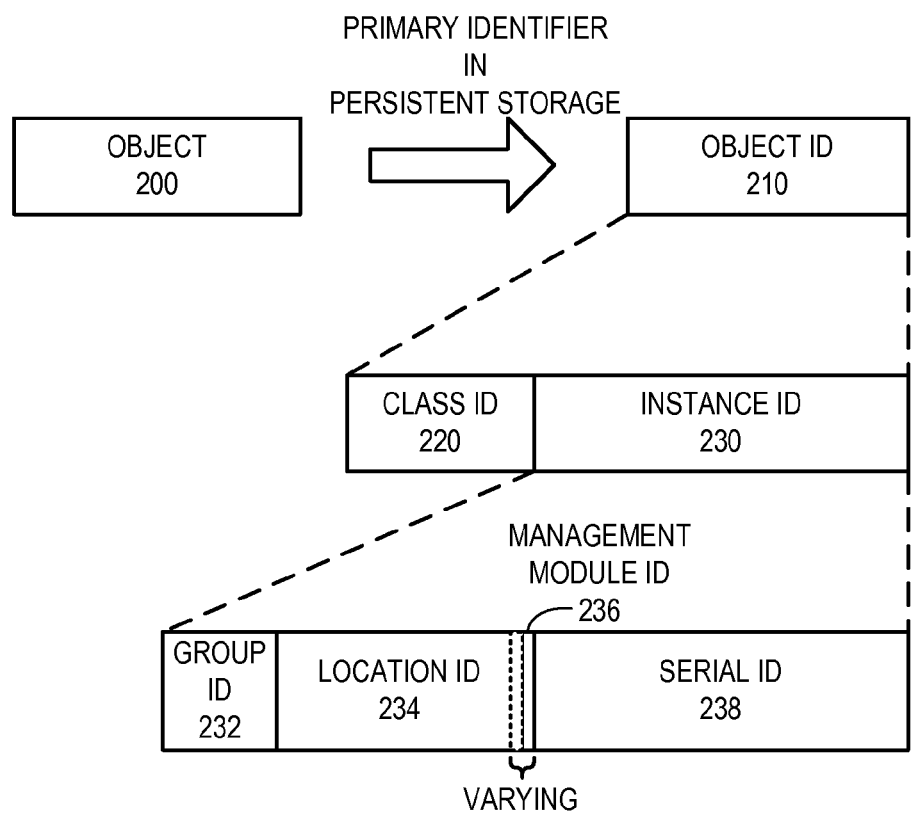
FIG. 2 illustrates an exemplary object identifier generated by a persistent storage framework in a switch, in accordance with an embodiment of the present invention.

FIG. 2 illustrates an exemplary object identifier generated by a persistent storage framework in a switch, in accordance with an embodiment of the present invention. During operation, an object 200 of a class is created in the memory of a switch. The persistent storage framework of the switch creates an object identifier 210 for object 200. This object identifier 210 can be the primary identifier for object 210 in the persistent storage. If the persistent storage is an object relational database, the database can include a table corresponding to the class. The attribute values of object 200 and object identifier 210 are inserted into the table. Object identifier 210 can be the primary key for that table.

In some embodiments, object identifier includes a class identifier (a class ID or CID) 220 and an instance identifier (an instance ID or IID) 230. Class identifier 220 represents the class from which the object is instantiated. In some embodiments, class identifier 220 is generated based on a hash function (e.g., Rabin Polynomial hash function) applied to the name of the class. Instance identifier 230 represents that particular instance of the object. Hence, if two objects of the same class are created, class identifier 220 of object identifier 210 remains the same for both the objects. However, the two objects differ in their respective instance identifier 230. Typically, class identifier 220 and instance identifier 230 are 32 and 64 bits long, respectively. However, these lengths can vary.

In some embodiments, instance identifier 230 includes a group identifier 232, a location identifier 234, a management module identifier 236, and a serial identifier 238. Group identifier 232 identifies a group in which the switch is a member. For example, if the switch is a member switch of a fabric switch, group identifier 232 can be a fabric switch identifier, which identifies a fabric switch. Location identifier 234 identifies the switch in the group. For example, if the switch is a member switch of a fabric switch, location identifier 234 can be a switch identifier, which identifies the switch within that fabric switch. Typically, group identifier 232 and location identifier 234 are 10 and 20 bits long, respectively.

Management module identifier 236 identifies the type of management module is operating the switch. For example, if the switch is participating in an active-standby high availability protocol (e.g., Virtual Router Redundancy Protocol (VRRP) and Virtual Switch Redundancy Protocol (VSRP)), management module identifier 236 can indicate whether the switch is an active or a standby switch. Typically, management module identifier 236 is 1 bit long. However, length of management module identifier 236 can be increased by incorporating adjacent bits from location identifier 234.

Serial identifier 238 provides identification of a specific instance of an object and can be a wrapped-around monotonically increasing number (e.g., an unsigned integer). Typically, serial identifier 238 is 32 bits long. In this way, object identifier 210 uniquely identifies an object of a class created by a management module in a switch, which can be in a fabric switch. In other words, object identifier 210 can be unique among objects, classes, management modules, fabric switches, and switch locations within a corresponding fabric switch.

Base Classes

In the example in FIG. 1B, persistent storage framework 120 maps classes to object relational tables in database 150, and inserts attribute values of an object of the class into the table. Framework 120 provides a set of base classes from which a class created for an operational unit of switch 102 can be inherited from. These base classes provide a development framework for the operational units and ensure that the operational units of switch 102 remain structured during operation. In this way, framework 120 can facilitate structured persistent storage to the attribute values of the operational units.

Figure 3:
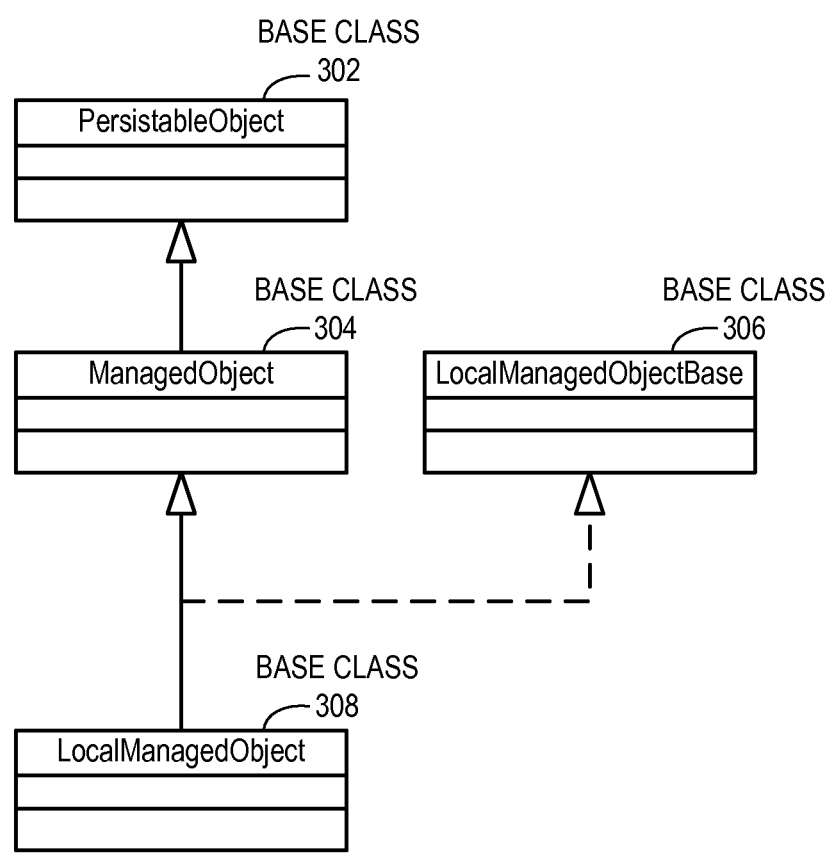
FIG. 3 illustrates exemplary base classes for supporting a persistent storage framework in a switch, in accordance with an embodiment of the present invention.

The framework supports a set of base classes and multiple inheritance from these base classes. FIG. 3 illustrates exemplary base classes for supporting a persistent storage framework in a switch, in accordance with an embodiment of the present invention. In some embodiments, the most base class 302 is the PersistableObject class. This class outlines the most fundamental operations supported by the persistent storage framework of a switch. Another base class 304, denoted as the ManagedObject class, is virtually derived from the PersistableObject class. Any object instantiated from an inheritance chain of the ManagedObject class can be referred to as a managed object. The framework provides seamless persistent storage support to these managed objects.

Class 304 outlines the most common attributes and operations of the objects managed by the framework. In other words, all class hierarchies derive virtually from the PersistableObject class. Since a class can inherit from multiple classes and each of these classes can inherit from the PersistableObject class, there can potentially be a conflict during execution of a managed object. This problem is generally referred to as the diamond problem. To solve this problem, the framework supports virtual derivation from the PersistableObject class. Another base class 306, denoted as the LocalManagedObjectBase class, outlines the attributes and operations locally managed within a switch. For example, a port is locally managed in a switch.

Base class 308, denoted as the LocalManagedObject class, is virtually derived from the ManagedObject class and the ManagedObjectBase class. Hence, the LocalManagedObject class outlines the attributes and operations of a switch which are locally and globally managed. For example, a port is locally managed within a switch and a VLAN configured for the port is managed globally. In some embodiments, an application (e.g., a protocol plug-in) running on a switch can specify more base classes for that application. Typically, base classes are not directly mapped to the tables of the object relational database. These base classes provide object relational mapping support. The attributes (i.e., the data fields) of these classes become part of a respective managed object derived from these base classes. As a result, the managed objects can share states and behavior.

In some embodiments, the attributes of a managed object can be any of the attribute data types supported by the framework, as described in conjunction with Table 1. The framework also supports vector variants (e.g., arrays and lists) for a number of the data types. Furthermore, the framework provides support to check whether a particular attribute is user configured. As described in conjunction with FIG. 3, the framework supports hierarchical managed objects based on inheritance. The framework also supports weak and strong references to objects. A weak reference does not protect the referenced object from being destroyed (e.g., by a garbage collector), unlike a strong reference, which protects the object from being destroyed.

Object Relational Mapping

In some embodiments, a persistent storage framework of a switch supports, both one-to-one and one-to-many, association, aggregation, and composition UML relationships. Association and aggregation are supported via ObjectID and ObjectIDVector data types, and ObjectIDAssociation and ObjectIDAssociationVector attributes, respectively. On the other hand, composition is supported via ManagedObectPointer and ManagedObectPointerVector data types and corresponding attributes. In some embodiments, the framework supports smart pointers and vector to facilitate seamless development.

Figure 4A:
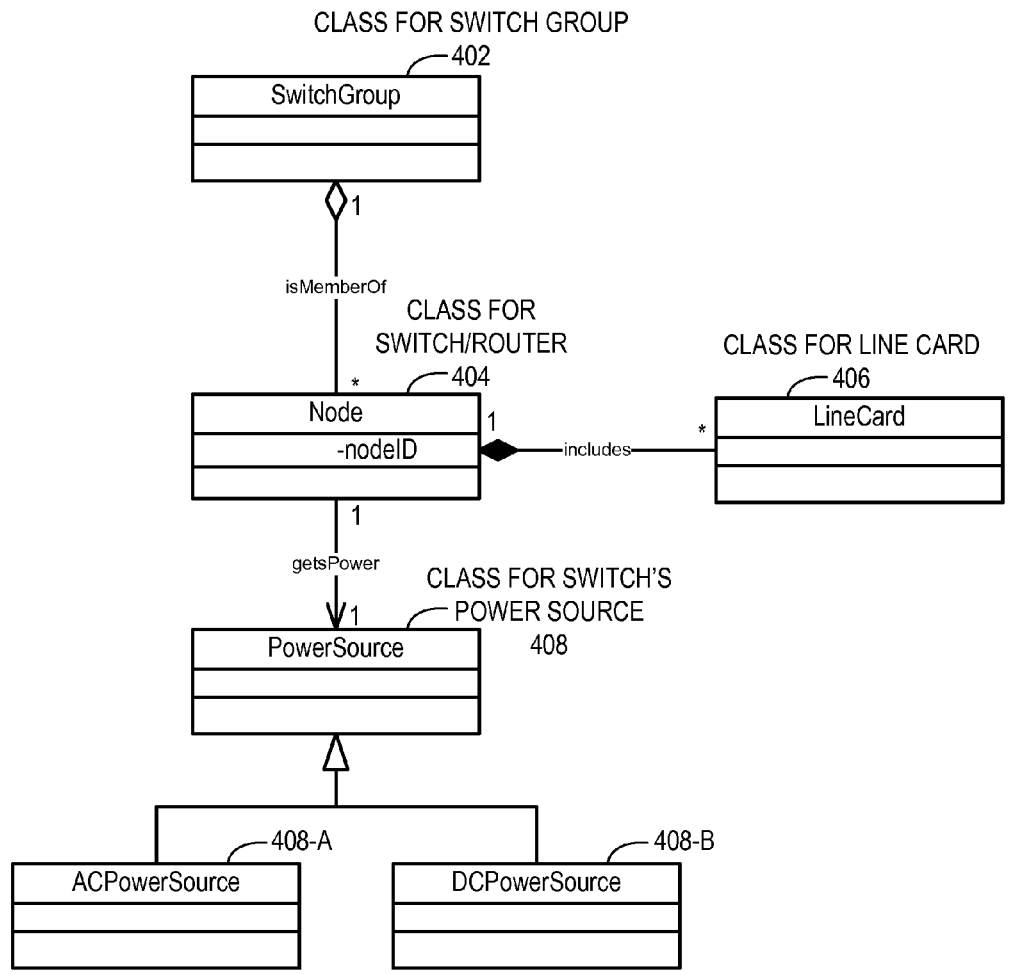
FIG. 4A illustrates an exemplary Unified Modeling Language (UML) model of classes of a switch with a persistent storage framework, in accordance with an embodiment of the present invention.

FIG. 4A illustrates an exemplary UML model of classes of a switch with a persistent storage framework, in accordance with an embodiment of the present invention. In this example, a class 404, denoted as the Node class, represents network nodes, such as a switch or a router. Attributes for the Node class includes a NodeID, which represents an identifier for a node. Since a switch can be a member of a switch group (e.g., a fabric switch), the Node class has a relationship with class 402, denoted as the SwitchGroup class, which represents a group of switches. A switch can be in one such switch group and a switch group aggregates a plurality of switches. Hence, the relationship between the Node class and the SwitchGroup class is a one-to-many aggregation, which is denoted as "isMemberOf." In this relationship, the SwitchGroup class can be referred to as the container class since a switch group "contains" a switch. On the other hand, the Node class can be referred to as a related class.

Similarly, a switch can include one or more line cards. Hence, the Node class has a relationship with class 406, denoted as the LineCard class, which represents a line card. A line card can be in one switch and a switch includes (i.e., is composed of) a plurality of line cards. Hence, the relationship between the Node class and the LineCard class is a one-to-many composition, which is denoted as "includes." On the other hand, a switch typically has a power source, which may not be inside of the switch. So, the Node class has a relationship with class 408, denoted as the PowerSource class, which represents a power source of a node. Suppose that, at a time, a power source can power one switch and a switch can receive power from one source. Hence, the relationship between the Node class and the PowerSource class is a one-to-one association, which is denoted as "getsPower."

A power source can be based on alternating current (AC) or direct current (DC). So, class 408-A, denoted as the ACPowerSource class, and class 408-B, denoted as the DCPowerSource class, are derived from the PowerSource class. The ACPowerSource class and the DCPowerSource class represent AC and DC power sources, respectively. Hence, based on the getsPower association, a Node can get power from a generic power source, an AC power source, or a DC power source. In this UML diagram, since the relationship between the Node class and class 408 is one-to-one, an object of the Node class can have only one of the power sources. In this example, the PowerSource class, the ACPowerSource class, and the DCPowerSource class can be referred to as the inheritance chain of the PowerSource class (class 408).

The framework can receive the UML diagram of FIG. 4A and generate the corresponding classes in a supported programming language (e.g., C++, Java, C#, etc). Furthermore, the framework generates an object relational table for the classes in the model. Furthermore, the framework can generate corresponding auxiliary tables to represent one-to-many relationships, as well as tables for classes in an inheritance chain (e.g., class derivations) and for their corresponding instances (i.e., objects), as described in conjunction with FIGS. 4C and 4D. In some embodiments, the framework receives XML representation of classes and their relationship (e.g., from a user), and generates the corresponding classes and tables. FIG. 4B illustrates an exemplary XML representation of a class corresponding to a switch with a persistent storage framework, in accordance with an embodiment of the present invention. In this example, XML definition 400 represents the Node class (class 404 of the UML model in FIG. 4A). XML definition 400 represents class Node as a ManagedObject with name "Node."

XML definition 400 includes a respective attribute, such as NodeID, and its type (i.e., data type, as described in conjunction with Table 1). XML definition 400 also includes one-to-one and one-to-many relationships for which the Node class is a container class. For example, a node contains line cards. Hence, XML definition 400 specifies aggregation "includes" as an attribute, its type, and the class to which Node is related. It should be noted that the isMemberOf relationship is not represented in XML definition 400 even though the isMemberOf relationship to the Node class. This is because the container class for the isMemberOf relationship is the SwitchGroup class. Hence, the isMemberOf relationship is represented in an XML definition corresponding to the SwitchGroup class (not shown in FIG. 4B).

Persistent Storage in a Switch

Figure 4C:
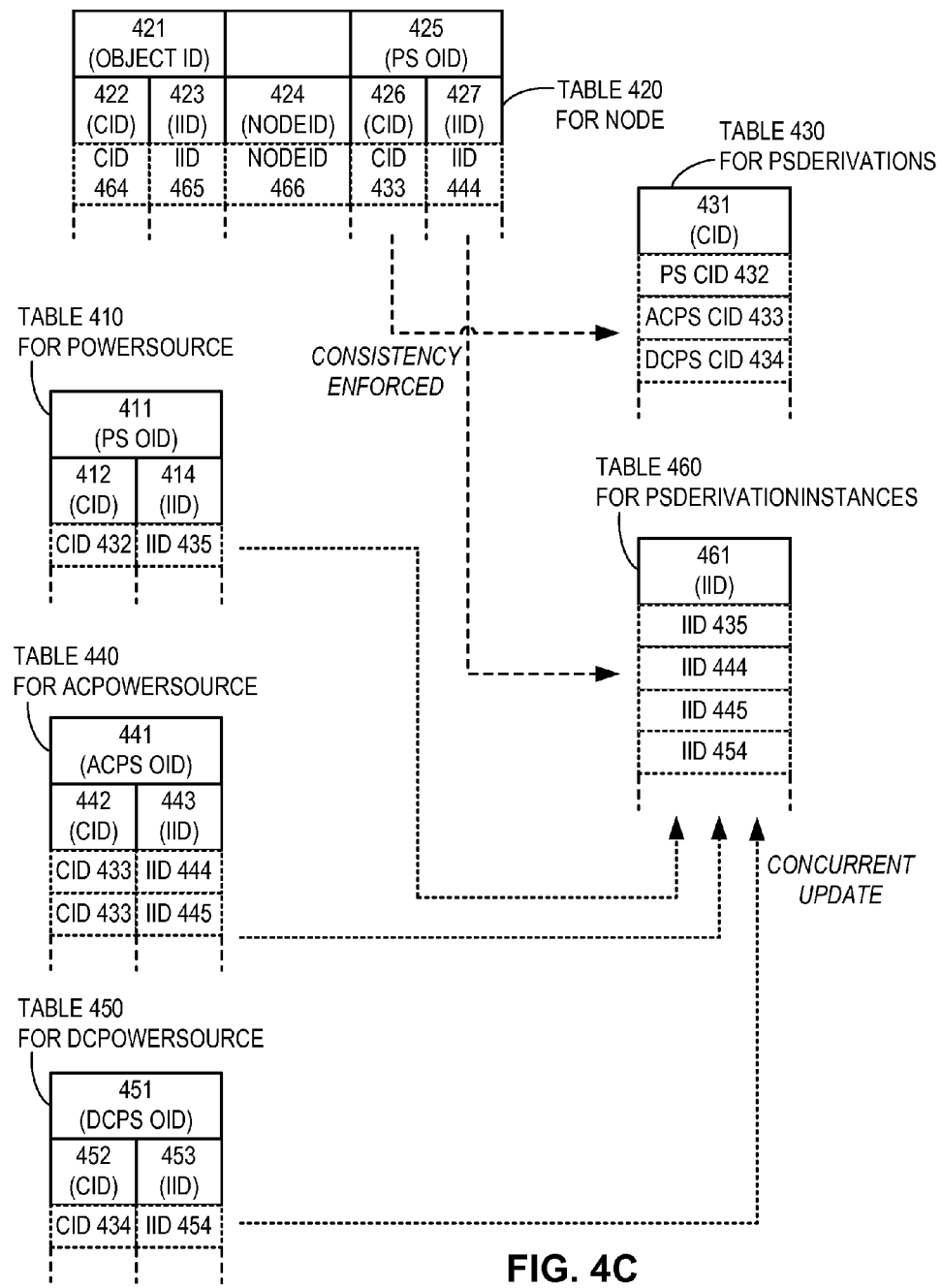
FIG. 4C illustrates exemplary tables generated by a persistent storage framework in a switch, in accordance with an embodiment of the present invention.

Upon receiving XML definitions associated with the classes of a UML model, the framework creates a respective table for a respective class, their derivations, their instances (i.e., objects), and their one-to-many relationships in an object relational database. FIG. 4C illustrates exemplary tables generated by a persistent storage framework in a switch, in accordance with an embodiment of the present invention. During operation, the persistent storage framework of the switch generates a table 420 for the Node class in an object relational database. Table 420 includes a column 421 for an object identifier associated with the Node class. Column 421 includes two columns 422 and 423 for class identifier and instance identifier, respectively, of the object identifier associated with the Node class.

Table 420 also includes a column for a respective attribute of the Node class. For example, table 420 includes a column 424 for a NodeID of the Node class. Furthermore, since the Node class has a one-to-one association with the PowerSource class, for which the Node class is the container class, the framework includes a column 425 for an object identifier of an object of the PowerSource class (i.e., an object associated with the PowerSource class). Column 425 includes two columns 426 and 427 for the class identifier and instance identifier, respectively, of the object identifier associated with the PowerSource class. The framework also creates a table 410 for the PowerSource class, comprising column 411 for the object identifier associated with the PowerSource class. Column 411 includes two columns 412 and 413 for the class identifier and instance identifier, respectively, of the object identifier of the PowerSource class.

Similarly, the framework also creates a table 440 for the ACPowerSource class, comprising column 441 for an object identifier of an object of the ACPowerSource class (i.e., an object associated with the ACPowerSource class). Column 441 includes two columns 442 and 443 for the class identifier and instance identifier, respectively, of the object identifier associated with the ACPowerSource class. In the same way, the framework also creates a table 450 for the DCPowerSource class, comprising column 451 for an object identifier of an object of the PowerSource class. Column 451 includes two columns 452 and 453 for the class identifier and instance identifier, respectively, of the object identifier associated with the DCPowerSource class.

In some embodiments, the framework creates auxiliary tables to enforce consistency on columns 426 and 427. For example, the framework creates an auxiliary table 430 for the derivations of the PowerSource class (e.g., based on the UML model in FIG. 4A). In this example, table 430 corresponds to the PowerSource, ACPowerSource, and DCPowerSource classes. Table 430 includes a column 431 for the class identifier associated with the derivations of the PowerSource class. Similarly, the framework creates an auxiliary table 460 for the objects instantiated from the derivations of the PowerSource class. In this example, table 460 corresponds to the PowerSource, ACPowerSource, and DCPowerSource classes. Table 460 includes a column 461 for the instance identifiers of the objects instantiated from the derivations of the PowerSource class.

When a class identifier is generated for any class of the inheritance chain of the PowerSource class, that class identifier is inserted into table 430. The framework identifies the PowerSource, the ACPowerSource, and the DCPowerSource classes of the inheritance chain of the PowerSource class from the UML model in FIG. 4A and generates class identifiers 432, 433, and 434, respectively. The framework then inserts class identifiers 432, 433, and 434 into table 430. In this example, an entry in a table is denoted with dotted lines. Column 431 of table 430 provides consistency enforcement to column 426 of table 420 (denoted with a dashed arrow). In some embodiments, consistency enforcement of column 426 is based on a foreign key constraint on column 431 of table 430. On the other hand, when the framework identifies an object of the PowerSource, ACPowerSource, or the DCPowerSource class, the framework generates a corresponding object identifier and inserts the object identifier into table 410, 440, or 450, respectively.

When an object identifier is inserted into table 410, 440, or 450, the instance identifier of the object identifier is concurrently inserted into table 460 (denoted with dotted arrow). Suppose that, upon detecting an object in the memory of the switch, the framework inserts an object identifier comprising a class identifier 432 and instance identifier 435 into table 410. Similarly, an object identifier comprising a class identifier 433 and instance identifier 444, and an object identifier comprising a class identifier 433 and instance identifier 445 are inserted into table 440. An object identifier comprising a class identifier 434 and instance identifier 454 is inserted into table 450. The framework ensures that instance identifiers 435, 444, 445, and 454 are also inserted into table 460. Column 461 of table 460 provides consistency enforcement to column 426 of table 420 (denoted with a dashed arrow). In some embodiments, consistency enforcement to column 427 is based on a foreign key constraint on column 461 of table 460.

During operation, an object of the Node class is instantiated in the memory of the switch. The framework identifies the object in the memory and generates an object identifier for the object comprising a class identifier 464 and an instance identifier 465. The framework identifies the attribute values of the object, which includes NodeID 466 and an object identifier of a power source object. Suppose that the power source for the switch is an AC power source, and the object identifier comprises a class identifier 433 and an instance identifier 444, as stored in table 440 corresponding to the ACPowerSource class. The framework creates an entry in table 420 by inserting class identifier 464, instance identifier 465, NodeID 466, class identifier 433, and instance identifier 444 into table 420. Since consistency is enforced on columns 426 and 427, the relational database ensures that class identifier 433 and instance identifier 444 appear in columns 431 and 461, respectively.

Figure 4D:
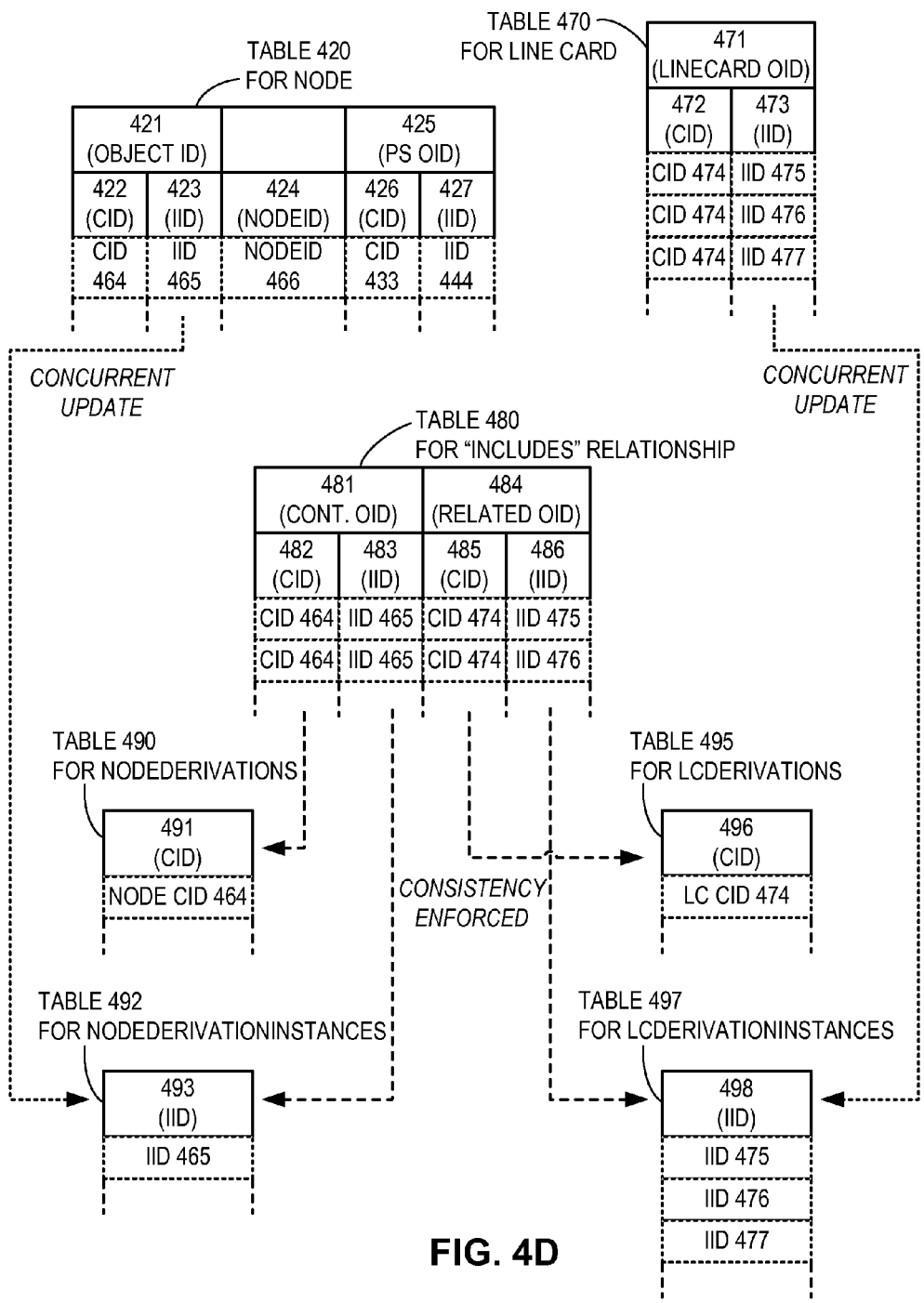
FIG. 4D illustrates an exemplary table representing a one-to-many association, which is generated by in a persistent storage framework in a switch, in accordance with an embodiment of the present invention.

However, even though the Node class is related to the LineCard class, since it is a one-to-many relationship, table 420 does not include an object identifier associated with the LineCard class. The framework creates an auxiliary table to represent the relationship the Node class and the LineCard class. FIG. 4D illustrates an exemplary table representing a one-to-many association, which is generated by a persistent storage framework in a switch, in accordance with an embodiment of the present invention. Upon detecting the LineCard class in the UML model in FIG. 4A, the persistent storage framework of the switch generates a table 470 for the LineCard class in an object relational database. Table 470 includes a column 471 for an object identifier associated with the LineCard class. Column 471 includes two columns 472 and 473 for corresponding class identifier and instance identifier, respectively, of the object identifier associated with the LineCard class.

During operation, an object of the LineCard class is instantiated in the memory of the switch. The framework identifies the object in memory and generates an object identifier comprising a class identifier 474 and an instance identifier 475 for the object. The framework then creates an entry in table 470 by inserting the object identifier into table 470. Similarly, the framework generates an object identifier comprising a class identifier 474 and an instance identifier 476 for another object of the LineCard class, and a third object identifier comprising a class identifier 474 and an instance identifier 477 for an object of the LineCard class. The framework creates respective entries in table 470 by inserting these object identifiers into table 470.

In some embodiments, the framework creates an auxiliary table 480 to represent the one-to-many "includes" relationship between the Node class and the LineCard class. In the relationship, the Node class is the container class and the LineCard class is the related class. Table 480 includes a column 481 for an object identifier associated with the Node class, and a column 484 for an object identifier associated with the LineCard class. Column 481 includes two columns 482 and 483 for the class identifier and instance identifier, respectively, of the object identifier associated with the Node class. Similarly, column 484 includes two columns 485 and 486 for the class identifier and instance identifier, respectively, of the object identifier associated with the LineCard class.

Suppose that the object of the Node class, which is associated with class identifier 464 and instance identifier 465, includes two line cards. Hence, the object of the Node class include two objects (e.g., an ManagedObjectVector) of the LineCard class. Suppose that instance identifiers 475 and 476 belong to these two objects. As a result, the framework inserts class identifier 464, instance identifier 465, class identifier 474, and instance identifier 475 into table 480. The framework also inserts class identifier 464, instance identifier 465, class identifier 474, and instance identifier 476 into table 480. In this way, the relationship between the object of the Node class (associated with instance identifier 465) and two objects of the LineCard class (associated with instance identifier 475 and 476) is stored in table 480.

In some embodiments, similar to tables 430 and 460, the framework creates auxiliary table 490 for the derivations of the Node class (e.g., based on the UML model in FIG. 4A). In this example, table 490 corresponds to the Node class (and its derivations, if any). Table 490 includes a column 491 for the class identifier associated with the derivations of the Node class. Similarly, the framework creates an auxiliary table 492 for the objects instantiated from the derivations of the Node class. In this example, table 492 corresponds to the Node class (and its derivations, if any). Table 492 includes a column 493 for the instance identifiers of the objects instantiated from the derivations of the Node class.

In the same way, the framework creates auxiliary table 495 for the derivations of the LineCard class (and its derivations, if any). Table 495 includes a column 496 for the class identifier associated with the derivations of the LineCard class. Similarly, the framework creates an auxiliary table 497 for the objects instantiated from the derivations of the LineCard class. In this example, table 497 corresponds to the LineCard class (and its derivations, if any). Table 497 includes a column 498 for the instance identifiers of the objects instantiated from the derivations of the LineCard class.

When a class identifier is generated for the Node class or the LineCard class, that class identifier is inserted into table 490 or 495, respectively. The framework inserts class identifiers 464 and 474 associated with the Node and the LineCard classes, respectively, into tables 490 and 495, respectively. In this example, an entry in a table is denoted with dotted lines. Column 491 of table 490 provides consistency enforcement to column 482 of table 480 (denoted with a dashed arrow). In some embodiments, consistency enforcement of column 482 is based on a foreign key constraint on column 491 of table 490. In the same way, column 496 of table 495 provides consistency enforcement to column 485 of table 480 (denoted with a dashed arrow). In some embodiments, consistency enforcement of column 485 is based on a foreign key constraint on column 496 of table 495.

On the other hand, when the framework identifies objects of the Node or the LineCard class, the framework generates a corresponding object identifier and inserts the object identifier, comprising a class identifier and an instance identifier, into table 420 or 470, respectively. When an object identifier is inserted into table 420 or 470, the instance identifier of the object identifier is concurrently inserted into table 492 or 497, respectively (denoted with dotted arrow). For example, when the framework inserts an object identifier comprising a class identifier 464 and instance identifier 465 into table 420, instance identifier 465 is inserted into table 492. In the same way, when the framework inserts an object identifier comprising a class identifier 474 and instance identifier 475 into table 470, instance identifier 475 is inserted into table 497.

Similar to table 480, the framework also creates an auxiliary table to represent the one-to-many "isMemberOf" relationship between the Node class and the SwitchGroup class, as described in conjunction with FIG. 4A. That table includes a column for an object identifier associated with the container class, which is the SwitchGroup class, and a column for an object identifier associated with the related class, which is the Node class. The column for the object identifier associated with the SwitchGroup class includes two columns corresponding to class identifier and instance identifier, respectively, of the object identifier. Similarly, the column for the object identifier associated with the Node class includes two columns corresponding to class identifier and instance identifier, respectively, of the object identifier.

It should be noted that the framework distinguishes between a composition relationship (e.g., "includes" in FIG. 4A) and an aggregation relation (e.g., "isMemberOf" in FIG. 4A). In some embodiments, for a composition relationship, the class definition of the container class includes an attribute of data type ManagedObject (and/or ManagedObjectPointer), as described in conjunction with Table 1. If the relationship is one-to-many, the date type can be ManagedObjectVector (and/or ManagedObjectPointerVector). In this way, when an object of the container class is instantiated, the related objects are created and included in that instantiated object of the container class. On the other hand, for an aggregation relationship, the class definition of the container class includes an attribute of data type ObjectId. If the relationship is one-to-many, the date type can be ObjectIdVector. In this way, the objects are created separately, and when an object of the container class is instantiated, only references to those related objects are included in that instantiated object of the container class.

Operations of a Persistent Storage Framework

Figure 5A:
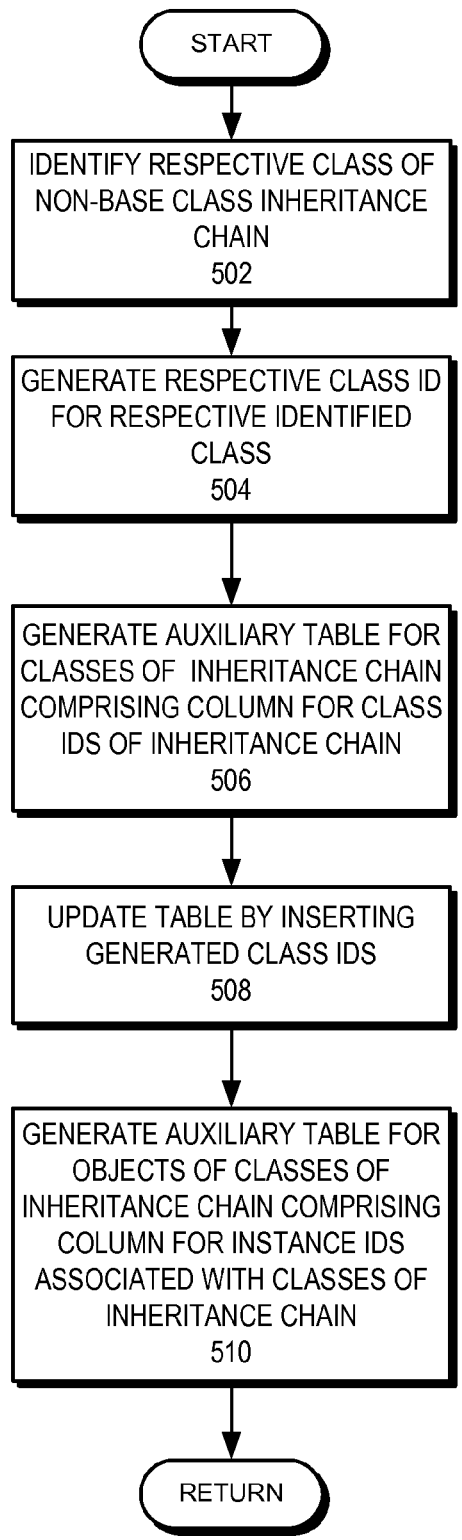
FIG. 5A presents a flowchart illustrating the process of a persistent storage framework of a switch generating auxiliary tables for an inheritance chain in a persistent storage, in accordance with an embodiment of the present invention.

FIG. 5A presents a flowchart illustrating the process of a persistent storage framework of a switch generating auxiliary tables for an inheritance chain in a structured persistent storage, in accordance with an embodiment of the present invention. During operation, the framework identifies a respective class of a non-base class inheritance chain (operation 502). The framework generates a respective class identifier for a respective identified class (operation 504). The framework generates an auxiliary table for the classes of the inheritance chain comprising a column for the class identifiers of the inheritance chain (operation 506) and updates the table for the classes of the inheritance chain by inserting the generated class identifiers (operation 508). The framework also generates an auxiliary table for the objects (i.e., the instantiated objects) of the classes of the inheritance chain, each comprising a column corresponding to the instance identifiers associated with the classes of the inheritance chain (operation 510).

Figure 5B:
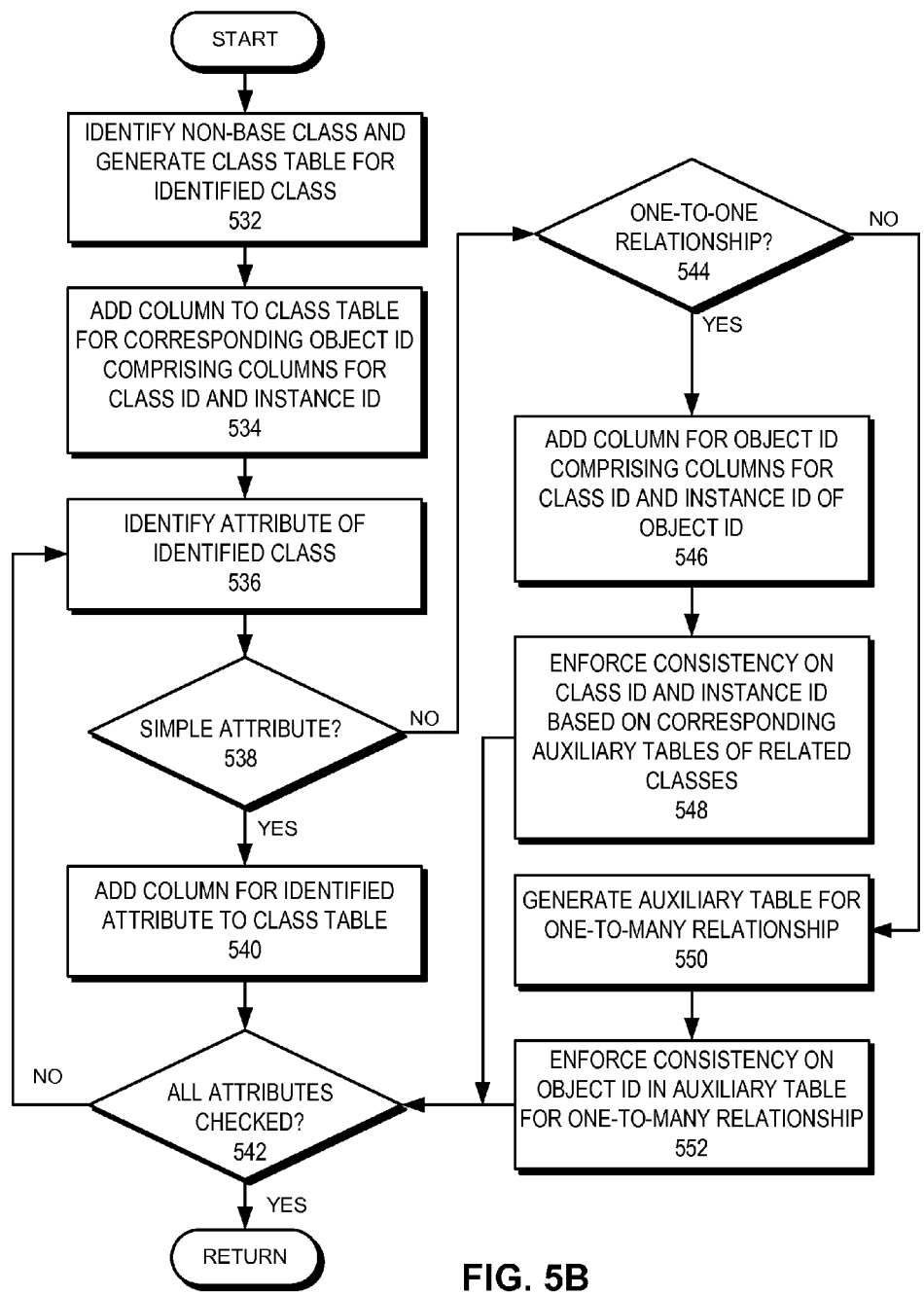
FIG. 5B presents a flowchart illustrating the process of a persistent storage framework of a switch generating class tables in a persistent storage, in accordance with an embodiment of the present invention.

FIG. 5B presents a flowchart illustrating the process of a persistent storage framework of a switch generating class tables in a structured persistent storage, in accordance with an embodiment of the present invention. During operation, the framework identifies a non-base class and generates a class table for the identified class (operation 532). In some embodiments, the framework identifies the class, and the attributes and operations (e.g., data members and methods) of the class from a class model (e.g., a UML model). The framework can receive the UML model from a graphical or textual input (e.g., a GUI, CLI, or XML file). In some embodiments, the table is named based on a hash function (e.g., a Rabin Polynomial hash function) calculated on the name of the class. The table can also have a prefix "T." For example, if the name of the class is Node and hash("Node") =xxx, the table name can be Txxx. The framework adds a column comprising columns for a class identifier and an instance identifier to the class table for an object identifier (operation 534), as described in conjunction with FIG. 4C.

The framework identifies an attribute of the identified class (operation 536). It should be noted that the relationships for which the class is a container class are can also be attributes, as described in conjunction with FIG. 4A. The framework then checks whether the attribute is a simple attribute (e.g., not a relationship) (operation 538). If the attribute is a simple attribute, the framework adds a column for the identified attribute to the class table (operation 540). If the attribute is not a simple attribute (e.g., an attribute representing a relationship), the framework checks whether the attribute corresponds to a one-to-one relationship (operation 544). If the attribute corresponds to a one-to-one relationship, the framework adds a column, which is for an object identifier, comprising columns for class identifier and instance identifier of the object identifier (operation 546), as described in conjunction with FIG. 4C.

The framework enforces consistency on the class identifier and the instance identifier based on the corresponding auxiliary tables of the related classes (operation 548), as described in conjunction with FIG. 4C. In some embodiments, the consistency is enforced based on a foreign key constraint. If the attribute does not correspond to a one-to-one relationship (i.e., corresponds to a one-to-many relationship), the framework generates an auxiliary table for the one-to-many relationship (operation 550) and enforce consistency on object identifiers in the auxiliary table for the one-to-many relationship (operation 552). Upon adding a column for the identified attribute (operation 540), enforcing consistency on the class identifier and the instance identifier (operation 548), or enforcing consistency on the object identifier (operation 552), the framework checks whether all attributes have been checked (operation 542). If not, the framework continues to identify an attribute of the identified class (operation 536).

Figure 5C:
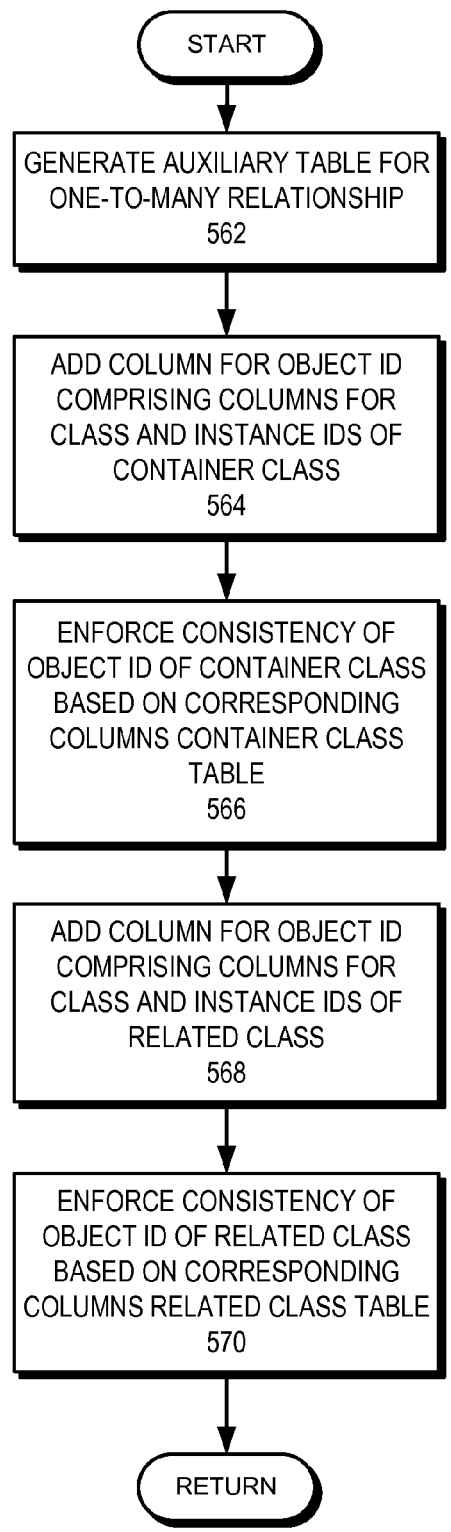
FIG. 5C presents a flowchart illustrating the process of a persistent storage framework of a switch generating an auxiliary table representing an one-to-many relationship in a persistent storage, in accordance with an embodiment of the present invention.

FIG. 5C presents a flowchart illustrating the process of a persistent storage framework of a switch generating an auxiliary table representing an one-to-many relationship in a structured persistent storage, in accordance with an embodiment of the present invention. Operations described in FIG. 5C elaborates operation 550 of FIG. 5B. During operation, the framework generates an auxiliary table for the one-to-many relationship (operation 562). In some embodiments, the name of the auxiliary table is based on the container table name, related table name, and the relationship name. For example, if the container table name is Txxx, related table name is Tyyy, and the relationship name is ABC, the name of the auxiliary table can be TxxxABCTyyy.

The framework adds a column for an object identifier comprising columns for class identifier and instance identifier of the container class (operation 564), as described in conjunction with FIG. 4D. The framework enforces consistency on the object identifier (i.e., both the class identifier and the instance identifier) of the container class based on the corresponding columns of the container class table (operation 566). Similarly, the framework adds a column for an object identifier comprising columns for class identifier and instance identifier of the related class (operation 568), as described in conjunction with FIG. 4D. The framework enforces consistency on the object identifier (i.e., both the class identifier and the instance identifier) of the related class based on the corresponding columns of the related class table (operation 570).

Figure 5D:
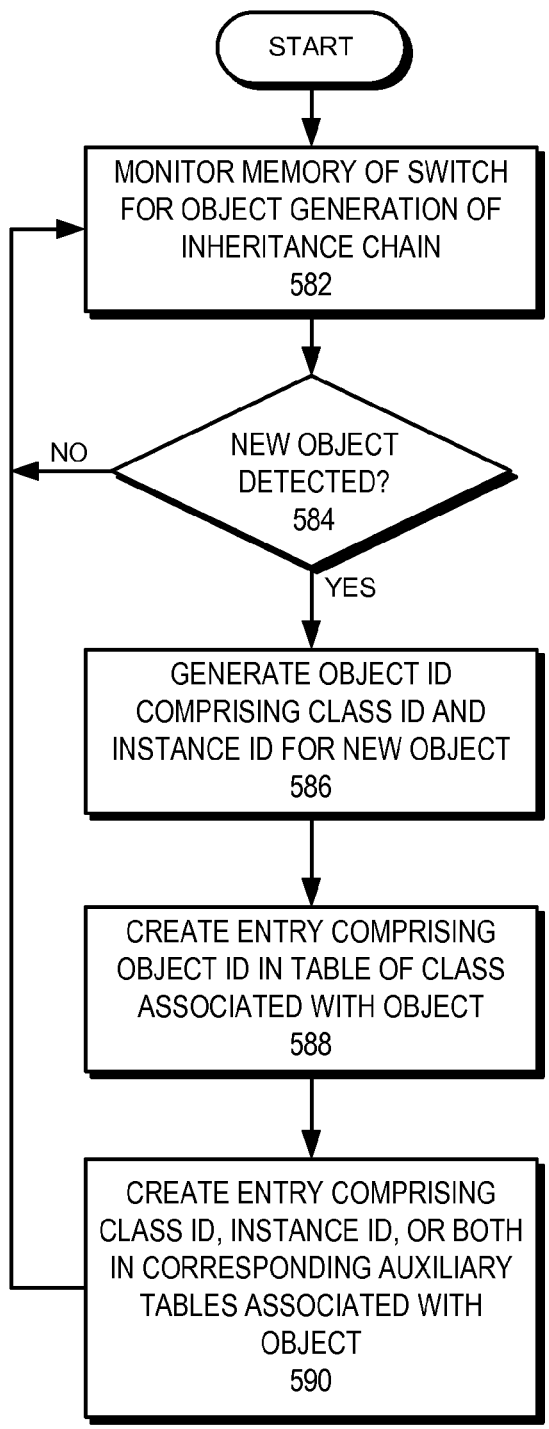
FIG. 5D presents a flowchart illustrating the process of a persistent storage framework of a switch updating tables in a persistent storage, in accordance with an embodiment of the present invention.

FIG. 5D presents a flowchart illustrating the process of a persistent storage framework of a switch updating tables in a persistent storage, in accordance with an embodiment of the present invention. During operation, the framework monitors the memory of the switch for object generation of the inheritance chain (operation 582) and checks whether a new object has been detected (operation 584). If a new object has not been detected, the framework continues to monitor the memory of the switch (operation 582). If a new object has been detected, the framework generates an object identifier comprising a class identifier and an instance identifier for the new object (operation 516). The frame creates an entry comprising the object identifier in the table of a class associated with the object (i.e., the class from which the object has been instantiated) (operation 588). The framework creates an entry comprising the class identifier, instance identifier, or both in corresponding auxiliary tables associated with the object (operation 590) and continues to monitor the memory of the switch (operation 582).

Fast Reboot

In the example in FIG. 1B, switch 102 can store configuration information in a configuration file. Examples of configuration information include, but are not limited to, network virtualizations, switch partitions, switch groups, and network protocols of different network layers. When switch 102 boots up, the attribute values of the configuration information are applied to switch 102 by loading the attribute values to the switch modules (i.e., ASIC chips of switch 102).

With existing technologies, before applying the configuration, switch 102 validates whether the configuration is correct and cross-checks whether the configuration includes any conflict. Moreover, during the boot up process, switch 102 reads and parses the attribute values stored in an unstructured format (e.g., a string comprising the configuration information). Switch 102 structures the attribute values during runtime, which is inefficient. As a result, each time switch 102 reboots, even when switch 102's configuration information is not changed, switch 102 goes through this extensive configuration process, which can be inefficient and cause delay to network convergence.

Figure 6:
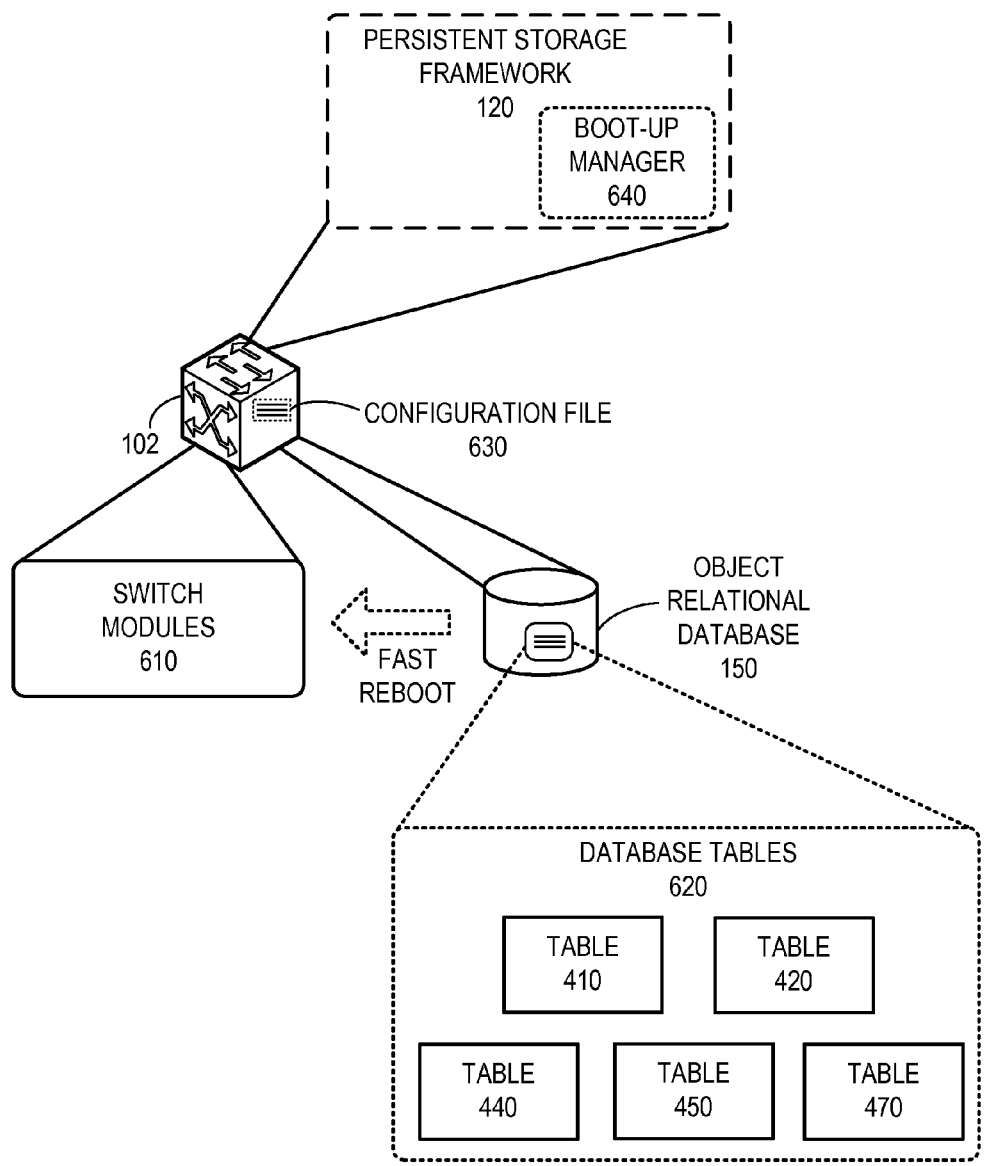
FIG. 6 illustrates an exemplary fast reboot of a switch with persistent storage framework, in accordance with an embodiment of the present invention.

To solve this problem, persistent storage framework 120 loads the configuration information from database 120 to the switch modules in switch 102. FIG. 6 illustrates an exemplary fast reboot of a switch with persistent storage framework, in accordance with an embodiment of the present invention. During the initial boot up process of switch 102, switch 102 validates, cross-checks, and executes the configuration information in configuration file 630. This configuration file 630 can be a batch file and processed sequentially (e.g., line by line), in switch 102. In some embodiments, switch 102 includes a boot-up manager 640, which can be in framework 120, for managing switch boot up. Boot-up manager 640 loads the corresponding attribute values into switch modules 610 of switch 102. Furthermore, framework 120 stores these attribute values in database tables 620 in database 150 of switch 102, as described in conjunction with FIGS. 4C-4D.

When switch 102 reboots (e.g., due to a restart), boot-up manager 640 checks whether configuration file 630 has changed (e.g., based on calculating a file difference and/or hash value). If boot-up manager 640 detects any change, boot-up manager 640 locates where the changes are and updates corresponding entries in database 150. If no change is detected, or the changes have been incorporated, boot-up manager 640 loads the attribute values from database tables 620 in database 150 to switch modules 610. In this way, boot-up manager 640 provides a fast reboot by bypassing the processing of configuration file 630, and its corresponding extensive execution, cross-checks, and validations of the configuration information. It should be noted that, in FIG. 6, database tables 620 shows the class tables since data included in the auxiliary tables are usually also included in the class tables.

Dependency in Configuration

In the example in FIG. 6, segments of configuration information in configuration file 630 often depend on each other. Typically, switch 102 processes the configuration information sequentially from configuration file 630. A user can enforce dependency in configuration by including configuration information from configuration file 630 in a proper order. For example, a port of switch 102 should be configured before associating the port with a port channel (e.g., for a trunked link). Hence, the administrator should include the configuration of the port prior to the configuration of a port channel in configuration file 630. However, since boot-up manager 640 of framework 120 bypasses processing of configuration file 630 during a reboot, when switch 102 reboots, dependency in the configuration information may not be enforced by configuration file 630.

To solve this problem, boot-up manager 640 uses dependency maps and a sequence table determine the order at which attribute values should be loaded into switch modules 610 from database 150. Framework 120 generates the dependency maps from the UML models (e.g., the UML model in FIG. 4A). However, since different operational units of a switch can be developed separately, a dependency map may not capture interdependencies among different UML models. To incorporate such dependency, framework 120 maintains a sequence table, which includes one or more execution passes (e.g., steps), and for each pass, one or more features that should be configured in that pass.

Figure 7A:
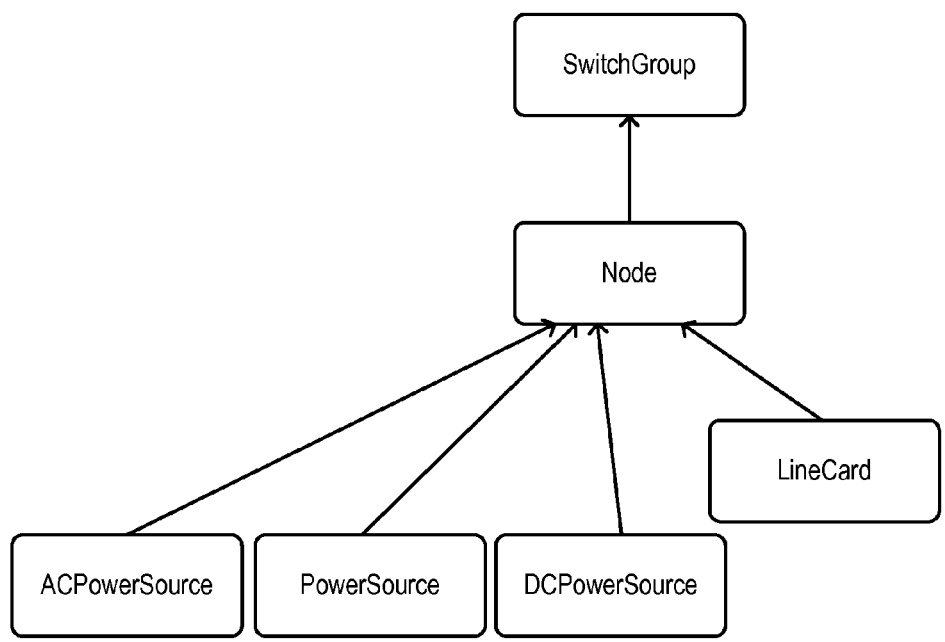
FIG. 7A illustrates an exemplary dependency map generated by a persistent storage framework in a switch, in accordance with an embodiment of the present invention.

FIG. 7A illustrates an exemplary dependency map generated by a persistent storage framework in a switch, in accordance with an embodiment of the present invention. In this example, dependency map 700 shows inter-dependency among the objects of different classes. The framework generates dependency map 700 based on the UML model in FIG. 4A. The LineCard class has a composition relationship with the Node class, which has an aggregation relationship with the SwitchGroup class. Furthermore, the Node class is associated with the inheritance chain of the PowerSource class. This inheritance chain includes the PowerSource class, the ACPowerSource class, and the DCPowerSource class.

Accordingly, dependency map 700 shows that the objects of the Node class depend on the objects of the LineCard class. For example, in switch 102, boot-up manager 640 should load the configuration information of the objects of the LineCard class from table 470, as shown in FIG. 4D, to switch modules 610, as shown in FIG. 6, before the configuration information of the objects of the Node class. Similarly, boot-up manager 640 should load the configuration information of the objects of the Node class from table 420, as shown in FIG. 4C, to switch modules 610 before the configuration information of the objects of the SwitchGroup class.

On the other hand, since the objects of the inheritance chain of the PowerSource class are not dependent on each other, boot-up manager 640 can load these objects from tables 410, 440, and 450, as shown in FIG. 4C, to switch modules 610 in parallel. However, boot-up manager 640 should load the configuration information of these objects to switch modules 610 before the configuration information of the objects of the Node class. In this way, during the fast boot-up process of switch 102, boot-up manager 640 ensures the configuration information of the objects of the interdependent classes are loaded to switch modules 610 in a proper order.

Figure 7B:
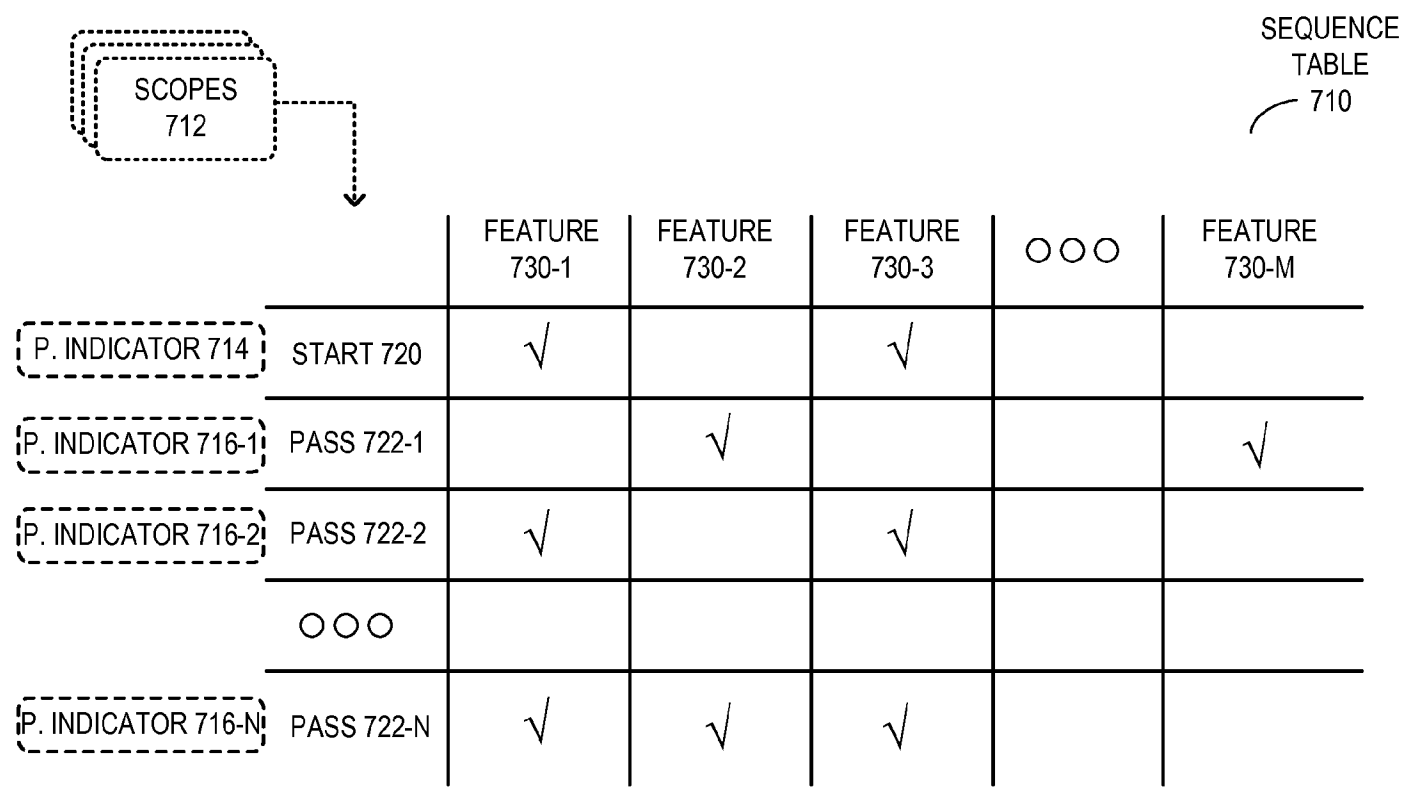

However, a dependency map only captures the dependencies expressed in a UML model. Different operational units of the switch are often developed separately (e.g., by different development groups). As a result, a dependency map may not capture interdependencies among different UML models. Hence, a boot-up manager may not be able to maintain proper order based only on dependency maps. FIG. 7B illustrates an exemplary sequence table which provides an order during a fast reboot of a switch, in accordance with an embodiment of the present invention. In this example, a sequence table 710 represents the order at which a boot-up manager loads configuration information to the switch modules. In some embodiments, sequence table 710 is expressed in XML.

Sequence table 710 includes one or more execution passes (e.g., steps), and for each pass, one or more features that should be configured in that pass. The switch sequentially loads configuration information of one pass at time, and sequentially loads attribute values of a respective feature in the order of the appearance of the feature in the pass to the processing hardware of the switch. In this way, the switch maintains the proper order during its fast reboot process.

A collection of attribute values in the configuration information can be referred to as a feature. Features can vary in the amount of configuration information (e.g., the number of attribute values) included in it. For example, one feature can correspond to a column in a table and another feature can correspond to the entire table in a persistent storage. The framework can generate the sequence table by parsing across difference dependency maps and connecting the common classes. The sequence table can also be generated and provided to the switch by a user (e.g., a developer).

Sequence table 710 includes rows corresponding to a start execution pass 720, which indicates it to be the first execution pass, and subsequent execution passes 722-1, 722-2, ..., 722-n. Sequence table 710 also includes columns corresponding to features 730-1, 730-2, 730-3, ..., 730-m. For a specific pass, one or more features can be selected (denoted with a check mark). For example, for start pass 720, features 730-1 and 730-3 are selected. During the boot-up process, the boot-up manager of the framework first load features 730-1 and 730-3 of start pass 720 to the switch modules. The boot-up manager then loads the features of pass 722-1, then of pass—722-2, and so on. It should be noted that the features and passes can be represented in a sequence table in rows and columns, respectively, as well.

In some embodiments, a respective pass is associated with a corresponding processing indicator (or p. indicator). A processing indicator indicates whether the features of that pass can be loaded serially or in parallel. Parallel loading of features can the reduce boot-up time. In sequence table 710, passes 720, 722-1, 722-2, ..., 722-n are associated with corresponding processing indicators 714, 716-1, 716-2, ..., 716-n, respectively. In some embodiments, a processing indicator is expressed as a field in an XML tag.

Processing indicators provide additional flexibility to the boot-up manager. For example, features 730-1 and 730-3 are selected for start pass 720 and pass 722-2. In one of the passes, features 730-1 and 730-3 can be loaded serially, and in the other pass, features 730-1 and 730-3 can be loaded in parallel. Furthermore, if some features in a pass can be loaded in parallel and some others should be loaded serially, the features that can be loaded in parallel can be put into a separate pass and the corresponding processing indicator can be set to parallel.

In some embodiments, sequence table 710 is associated with one or more scopes 712. A scope defines, for an operational aspect of the switch, the subset of attribute values of a feature that should be loaded to the switch modules. Scopes 712 allow sequence table 710 to load different subsets of attribute values of a feature to the switch modules under different circumstances. Suppose that a feature indicates VLANs associated with the switch. When the switch reboots, the corresponding scope in scopes 712 indicates that the attribute values associated with the entire switch should be loaded to the switch modules. As a result, the boot-up manager loads all VLAN configurations. On the other hand, when a single line card reboots (e.g., taken out and put in), the corresponding scope in scopes 712 indicates that the attribute values associated with that line card should be loaded into the switch modules. As a result, the boot-up manager loads only VLAN configurations associated with that line card.

Operations of Fast Reboot

Figure 8A:
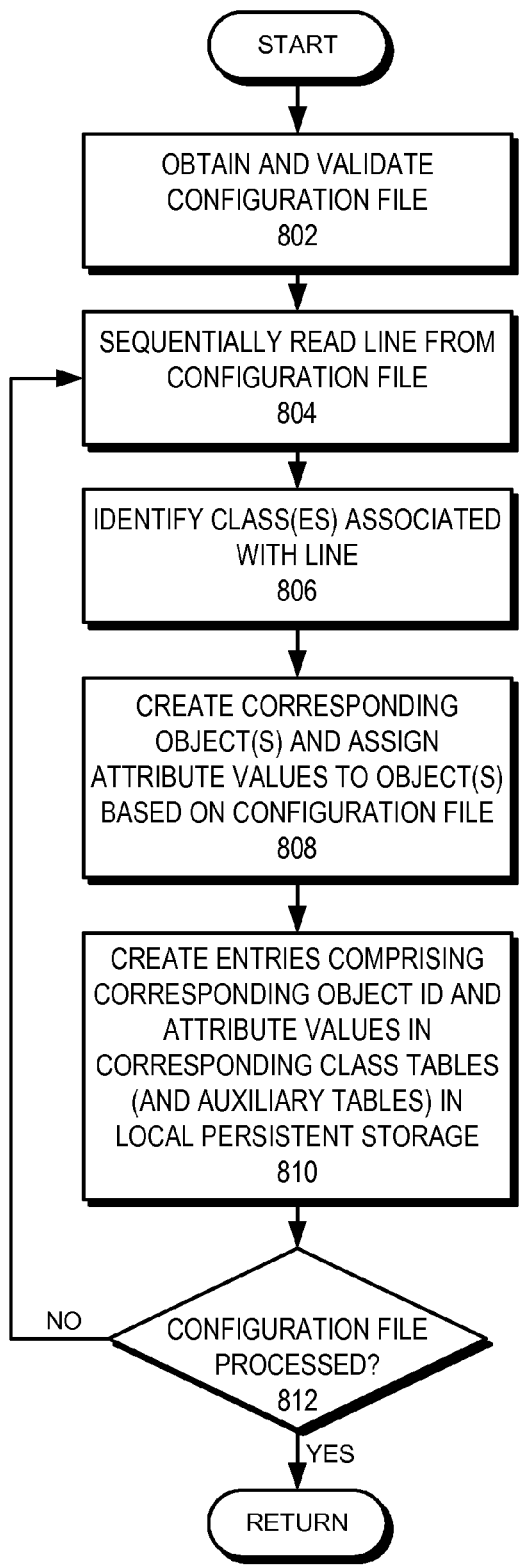
FIG. 8A presents a flowchart illustrating the initial boot up process of a switch with a persistent storage framework, in accordance with an embodiment of the present invention.

FIG. 8A presents a flowchart illustrating the initial boot up process of a switch with a persistent storage framework, in accordance with an embodiment of the present invention. In some embodiments, the boot up process of a switch is managed by a boot-up manager. During operation, the switch obtains and validates a configuration file (operation 802). The validation process includes checking whether the attribute values of the configuration file correspond to the correct fields. For example, a MAC address should not be assigned to a VLAN field in the configuration file. Furthermore, the validation process can include cross-checking among different fields of the configuration file.

The switch then sequentially reads a line from the configuration file (operation 804) and identifies the class(es) associated with the line (operation 804). In some embodiments, the configuration file is a batch file, which can be processed sequentially. The switch creates corresponding object(s) and assigns attribute values to the object(s) based the configuration file (operation 808). The switch then creates entries comprising corresponding object identifier and attribute values in corresponding class tables (and auxiliary tables) in the local persistent storage (operation 810) and checks whether the configuration file has been processed (operation 812). If the configuration file has not been processed, the switch sequentially reads the next line from the configuration file (operation 804).

Figure 8B:
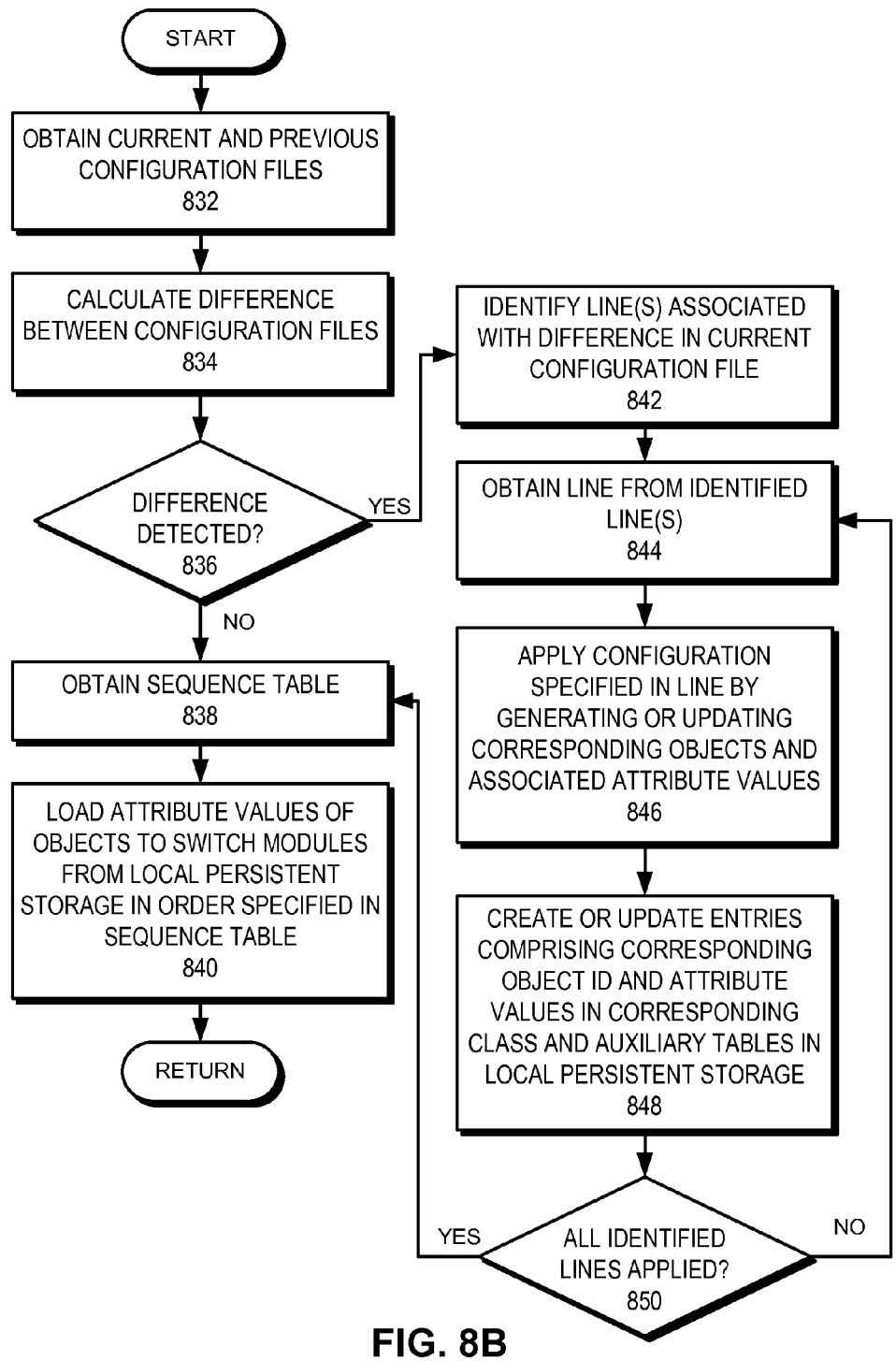
FIG. 8B presents a flowchart illustrating the fast reboot process of a switch with a persistent storage framework, in accordance with an embodiment of the present invention.

FIG. 8B presents a flowchart illustrating the fast reboot process of a switch with a persistent storage framework, in accordance with an embodiment of the present invention. In some embodiments, the fast reboot process is executed by a boot-up manager, which can be in the persistent storage framework. During operation, the switch obtains the current and previous configuration files (operation 832) and calculates the difference between the configuration files (operation 834). The switch checks whether it has detected a difference (i.e., whether the configuration file has been changed) (operation 836). In some embodiments, the switch applies a hash function to the configuration files and compares the corresponding hash values to determine whether the configuration file has been changed. It should be noted that the switch can use both file difference and hash function, or any other technique to determine the file difference.

If the switch has detected a difference, the user may have changed the configuration. The switch identifies the line(s) associated with the difference in the current configuration file (operation 842). The switch then obtains a line (e.g., the first line) from the identified line (operation 844) and applies the configuration specified in the line by generating or updating corresponding objects and associated attribute values (operation 846). The switch creates or updates entries comprising the corresponding object identifiers and attribute values in the corresponding class and auxiliary tables in the local persistent storage (operation 848), as described in conjunction with FIG. 5D. In this way, the switch allows partial processing of the configuration file. The switch checks whether it has applied all identified lines associated with the difference (operation 850). If the switch has not applied all the identified lines, the switch continues to identify the next line from the identified lines (operation 844).

If the switch has not detected a difference (operation 836), the configuration of the switch is the same as the initial boot-up, as described in conjunction with FIG. 8A. Since the switch stores the attribute values in its persistent database, the switch can proceed with a fast reboot by bypassing the processing of the configuration file, and its corresponding extensive execution, cross-checks, and validations of the configuration information. If the switch has not detected a difference (operation 836) or has applied all the identified lines (operation 850), the switch obtains its sequence table (operation 838). The switch then loads the attribute values of objects to the switch modules from the local persistent storage in the order specified in the sequence table (operation 840), as described in conjunction with FIG. 7B. This fast reboot process allows a fast convergence of the network which includes the switch.

Figure 8C:
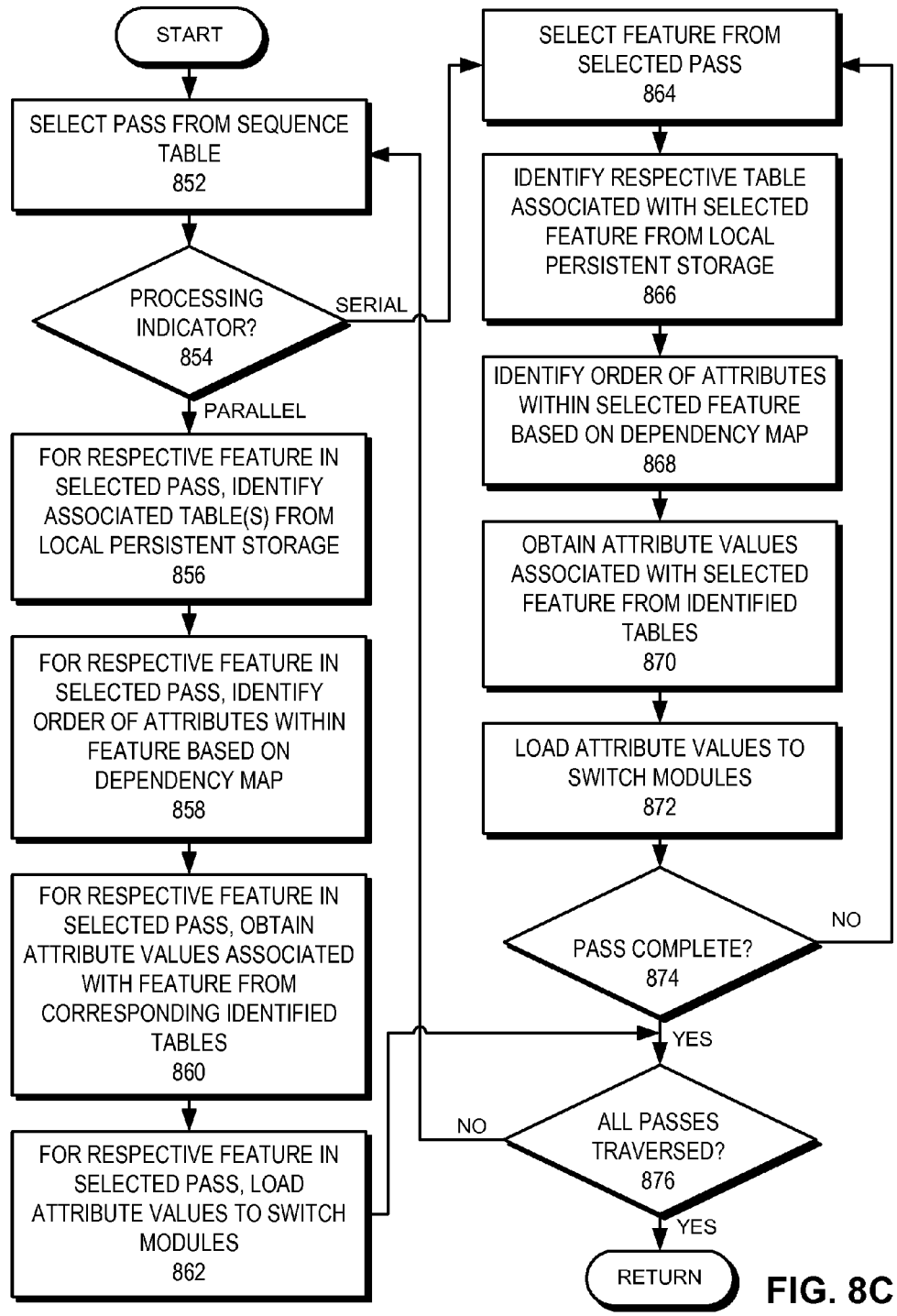
FIG. 8C presents a flowchart illustrating the process of a switch with a persistent storage framework using a sequence table for the fast reboot process, in accordance with an embodiment of the present invention.

FIG. 8C presents a flowchart illustrating the process of a switch with a persistent storage framework using a sequence table for the fast reboot process, in accordance with an embodiment of the present invention. Operations described in FIG. 8C elaborates operation 840 of FIG. 8B. In some embodiments, the fast reboot process is executed by a boot-up manager, which can be in the persistent storage framework. During operation, the switch selects a pass from the sequence table (operation 852) and checks the processing indicator of the pass (operation 854). If the processing indicator indicates serial processing, the switch selects a feature from the selected pass (operation 864) and identifies a respective table associated with the selected feature from the local persistent storage (operation 866).

The switch identifies the order of the attributes within the selected feature based on one or more dependency maps associated with the feature (operation 868). Here, the sequence table ensures the proper order among the features of the switch and the dependency maps associated with the feature ensures the proper order within that feature. A feature includes the attribute values whose interdependency is represented in an UML model and its corresponding dependency map. The switch obtains the attribute values associated with the selected feature from the identified tables (operation 870) and loads the attribute values to the switch modules (operation 872), as described in conjunction with FIG. 7B. The switch checks whether it has completed the pass (operation 874). If the switch has not completed the pass, the switch continues to select the next feature from the selected pass (operation 864).

On the other hand, if the processing indicator indicates parallel processing, a respective feature of the pass can be processed in parallel, thereby further speeding up the reboot process (i.e., reducing the reboot time). For a respective feature in the selected pass, the switch identifies associated table(s) from the local persistent storage (operation 856) and identifies the order of the attributes within the feature based on one or more dependency maps associated with that feature (operation 858). For a respective feature in the selected pass, the switch obtains the attribute values associated with the feature from the corresponding identified tables (operation 860) and loads the attribute values to the switch modules (operation 862), as described in conjunction with FIG. 7B.

If the processing indicator indicates parallel processing and the attribute values are loaded into the switch modules (operation 862), or the processing indicator indicates serial processing and the switch has completed the pass (operation 874), the switch checks whether the switch has traversed all passes of the sequence table (operation 876). If the switch has not traversed all passes of the sequence table, the switch selects the next pass from the sequence table (operation 852). In this way, using the sequence table, the switch provides a fast reboot by loading the attribute values associated with a configuration file of the switch into the processing hardware of the switch in the proper sequence without relying on the configuration file.

Exemplary Switch

Figure 9:
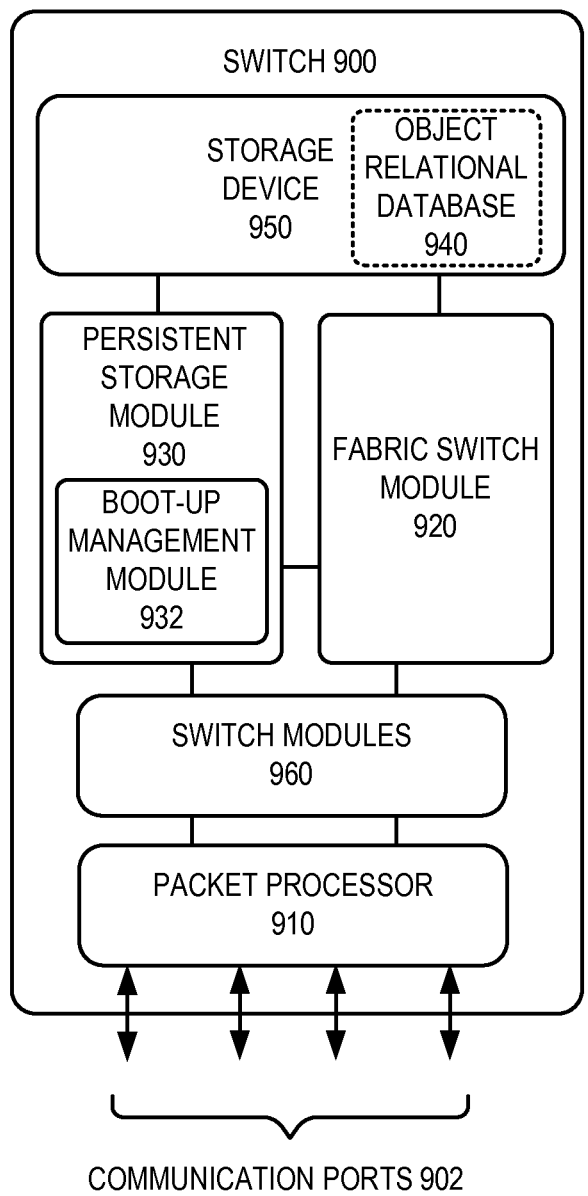
FIG. 9 illustrates an exemplary switch with a persistent storage framework and a fast reboot support, in accordance with an embodiment of the present invention.

FIG. 9 illustrates an exemplary switch with a persistent storage framework and a fast reboot support, in accordance with an embodiment of the present invention. In this example, a switch 900 includes a number of communication ports 902, a packet processor 910, a persistent storage module 930, a boot-up management module 932, and a storage device 950. Switch 900 can also include switch modules 960 (e.g., processing hardware of switch 900, such as its ASIC chips), which includes information based on which switch 900 processes packets (e.g., determines output ports for packets). Packet processor 910 extracts and processes header information from the received frames. Packet processor 910 can identify a switch identifier associated with the switch in header of a packet.

In some embodiments, switch 900 maintains a membership in a fabric switch, as described in conjunction with FIG. 1, wherein switch 900 also includes a fabric switch module 920. Fabric switch module 920 maintains a configuration database in storage device 950 that maintains the configuration state of every switch within the fabric switch. Fabric switch module 920 maintains the state of the fabric switch, which is used to join other switches. In some embodiments, switch 900 can be configured to operate in conjunction with a remote switch as an Ethernet switch.

Communication ports 902 can include inter-switch communication channels for communication within the fabric switch. This inter-switch communication channel can be implemented via a regular communication port and based on any open or proprietary format. Communication ports 902 can also include one or more extension communication ports for communication between neighbor fabric switches. Communication ports 902 can include one or more TRILL ports capable of receiving frames encapsulated in a TRILL header. Communication ports 902 can also include one or more IP ports capable of receiving IP packets. An IP port is capable of receiving an IP packet and can be configured with an IP address. Packet processor 910 can process TRILL-encapsulated frames and/or IP packets.

During operation, persistent storage module 930 stores configuration information, which can be in a configuration file, of switch 900 in a table in object relational database 940 in storage device 950. Boot-up management module 932 loads the attribute values to switch modules 960 from the table without processing the configuration file. Boot-up management module 932 also determines whether the configuration file has been changed during a reboot of switch 900. In some embodiments, upon determining that the configuration file has been changed, boot-up management module 932 determines the changed portion of the configuration file and update the first table in a local persistent storage based on the changed portion, as described in conjunction with FIG. 8B.

Boot-up management module 932 also maintains the order in which the attribute values are loaded to switch modules 960. In some embodiments, boot-up management module 932 maintains the order based on a sequence table, as described in conjunction with FIG. 8C. This sequence table includes one or more execution passes. Boot-up management module 932 sequentially loads attribute values of one pass at time. Boot-up management module 932 also maintains order of attribute values of a feature based on one or more dependency maps, which can be based on corresponding UML models.

Note that the above-mentioned modules can be implemented in hardware as well as in software. In one embodiment, these modules can be embodied in computer-executable instructions stored in a memory which is coupled to one or more processors in switch 900. When executed, these instructions cause the processor(s) to perform the aforementioned functions.

In summary, embodiments of the present invention provide a switch and a method which provide fast reboot for the switch. In one embodiment, the switch includes a packet processor, a persistent storage module, and a boot-up management module. The packet processor identifies a switch identifier associated with the switch in the header of a packet. The persistent storage module stores configuration information of the switch in a first table in a local persistent storage. This configuration information is included in a configuration file, and the first table includes one or more columns for the attribute values of the configuration information. The boot-up management module loads the attribute values to corresponding switch modules from the first table without processing the configuration file.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
   a packet processor configured to identify a switch identifier associated with the switch in a header of a packet;
   a persistent storage module configured to store configuration information of the switch in a first table in an object relational database in a local persistent storage, wherein the configuration information is included in a configuration file, and wherein the first table includes one or more columns for attribute values of the configuration information; and
   a boot-up management module configured to load the attribute values to corresponding switch hardware modules from the first table the object relational database without processing the configuration file.

2. The switch of claim 1, wherein the boot-up management module is further configured to determine whether the configuration file has been changed during a reboot of the switch.

3. The switch of claim 2, wherein, in response to determining that the configuration file has been changed, the boot-up management module is further configured to:
   determine a changed portion of the configuration file; and
   update the first table based on the changed portion.

4. The switch of claim 1, wherein the boot-up management module is further configured to maintain an order in which the attribute values are loaded to the switch hardware modules.

5. The switch of claim 4, wherein the boot-up management module maintains the order based on a sequence table, wherein the sequence table includes one or more execution passes, and wherein the boot-up management module sequentially loads attribute values of one pass at time to the switch hardware modules.

6. The switch of claim 5, wherein a pass includes one or more features which are loaded to the switch hardware modules during the pass, and wherein a feature corresponds to a collection of attribute values.

7. The switch of claim 6, wherein the boot-up management module maintains an order of attribute values of a feature based on a dependency map, wherein the dependency map indicates a dependency based on a Unified Modeling Language (UML) model.

8. The switch of claim 6, wherein a pass is associated with a processing indicator which indicates whether the features of a pass are loaded to the switch hardware modules serially or in parallel.

9. The switch of claim 4, wherein the sequence table is associated with a scope, wherein the scope indicates a subset of attribute values of a feature to be loaded to the switch hardware modules.

10. The switch of claim 4, wherein the sequence table is expressed based on Extensible Markup Language (XML).

11. The switch of claim 1, further comprising a fabric switch module configured to maintain a membership in a network of interconnected switches, wherein the network of interconnected switches is identified by a fabric identifier.

12. A method, comprising:
   identifying a switch identifier associated with a switch in a header of a packet;
   storing configuration information of the switch in a first table in an object relational database in a local persistent storage, wherein the configuration information is included in a configuration file, and wherein the first table includes one or more columns for attribute values of the configuration information; and loading the attribute values to corresponding switch hardware modules from the first table in the object relational database without processing the configuration file.

13. The method of claim 12, further comprising determining whether the configuration file has been changed during a reboot of the switch.

14. The method of claim 13, wherein, in response to determining that the configuration file has been changed, the method further comprises:
   determining a changed portion of the configuration file; and
   updating the first table based on the changed portion.

15. The method of claim 12, further comprising maintaining an order in which the attribute values are loaded to the switch hardware modules.

16. The method of claim 15, wherein the order is maintained based on a sequence table, wherein the sequence table includes one or more execution passes, and wherein the boot-up management module sequentially loads attribute values of one pass at time to the switch hardware modules.

17. The method of claim 16, wherein a pass includes one or more features which are loaded to the switch hardware modules during the pass, and wherein a feature corresponds to a collection of attribute values.

18. The method of claim 17, wherein an order of attribute values of a feature is maintained based on a dependency map, wherein the dependency map indicates a dependency based on a Unified Modeling Language (UML) model.

19. The method of claim 17, wherein a pass is associated with a processing indicator which indicates whether the features of a pass are loaded to the switch hardware modules serially or in parallel.

20. The method of claim 15, wherein the sequence table is associated with a scope, wherein the scope indicates a subset of attribute values of a feature to be loaded to the switch hardware modules.

21. The method of claim 15, wherein the sequence table is expressed based on Extensible Markup Language (XML).

22. The method of claim 12, further comprising maintaining a membership in a network of interconnected switches, wherein the network of interconnected switches is identified by a fabric identifier.

23. A computer system; comprising:
   a processor;
   a storage device coupled to the processor and storing instructions that when executed by the processor cause the processor to perform a method, the method comprising:
   identifying a switch identifier associated with a switch in a header of a packet;
   storing configuration information of the switch in a first table in an object relational database in a local persistent storage, wherein the configuration information is included in a configuration file, and wherein the first table includes one or more columns for attribute values of the configuration information; and
   loading the attribute values to corresponding switch hardware modules from the first table in the object relational database without processing the configuration file.

24. The computer system of claim 23, wherein the method further comprises maintaining an order in which the attribute values are loaded to the switch hardware modules, wherein the order is maintained based on a sequence table, wherein the sequence table includes one or more execution passes, and wherein the boot-up management module sequentially loads attribute values of one pass at time to the switch hardware modules.

25. The computer system of claim 24, wherein a pass includes one or more features which are loaded to the switch hardware modules during the pass, and wherein a feature corresponds to a collection of attribute values.

26. The computer system of claim 25, wherein a pass is associated with a processing indicator which indicates whether the features of a pass are loaded to the switch hardware modules serially or in parallel.

* * * * *